United States Patent
Nakamura et al.

(10) Patent No.: US 8,177,869 B2
(45) Date of Patent: May 15, 2012

(54) REACTION DEVICE, HEAT-INSULATING CONTAINER, FUEL CELL DEVICE, AND ELECTRONIC APPARATUS

(75) Inventors: Osamu Nakamura, Kodaira (JP); Masatoshi Nomura, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/877,580

(22) Filed: Sep. 8, 2010

(65) Prior Publication Data
US 2010/0329952 A1 Dec. 30, 2010

Related U.S. Application Data

(62) Division of application No. 11/646,030, filed on Dec. 27, 2006, now Pat. No. 7,811,341.

(30) Foreign Application Priority Data

| Dec. 28, 2005 | (JP) | 2005-378505 |
| Dec. 28, 2005 | (JP) | 2005-378549 |
| Dec. 15, 2006 | (JP) | 2006-338222 |

(51) Int. Cl.
| C01B 3/36 | (2006.01) |
| C01B 6/24 | (2006.01) |
| C01B 3/02 | (2006.01) |
| C01B 3/12 | (2006.01) |
| C10J 3/46 | (2006.01) |
| B01J 7/00 | (2006.01) |
| B01J 8/00 | (2006.01) |

(52) U.S. Cl. ........... 48/61; 48/197 R; 422/625; 422/626; 423/644; 423/648.1; 423/650; 423/655

(58) Field of Classification Search .......... 48/61, 197 R; 423/644, 648.1, 650, 655; 422/625–629
See application file for complete search history.

(56) References Cited

U.S. PATENT DOCUMENTS

| 6,485,852 | B1 | 11/2002 | Miller et al. |
| 6,797,022 | B1 | 9/2004 | Docter et al. |
| 2004/0025784 | A1* | 2/2004 | Kawamura et al. ........... 117/200 |
| 2004/0043263 | A1 | 3/2004 | Takeyama et al. |

(Continued)

FOREIGN PATENT DOCUMENTS

CN 1511062 A 7/2004

(Continued)

OTHER PUBLICATIONS

Chinese Office Action (and English translation) dated Jul. 11, 2008, issued in a counterpart Chinese Application.

(Continued)

*Primary Examiner* — Matthew Merkling
(74) *Attorney, Agent, or Firm* — Holtz, Holtz, Goodman & Chick, PC

(57) ABSTRACT

Disclosed is a reaction device that includes a reaction device main body that includes a first reaction unit and a second reaction unit, a container to house the reaction device main body and a first region that corresponds to at least the first reaction unit and a second region that corresponds to the second reaction unit, the first and second regions being provided to the container or internal side of the container. The first reaction unit is set to a temperature higher than that of the second reaction unit, and the first region has a higher reflectivity than that of the second region, with respect to a heat ray that is radiated from the reaction device main body.

12 Claims, 20 Drawing Sheets

U.S. PATENT DOCUMENTS

| | | |
|---|---|---|
| 2004/0148858 A1 | 8/2004 | Yamamoto et al. |
| 2004/0191591 A1 | 9/2004 | Yamamoto |
| 2005/0191534 A1 | 9/2005 | Kim et al. |
| 2008/0241020 A1 | 10/2008 | Miyamoto et al. |

FOREIGN PATENT DOCUMENTS

| | | |
|---|---|---|
| JP | 2003-089504 A | 3/2003 |
| JP | 2004-006265 A | 1/2004 |
| JP | 2004-296349 A | 10/2004 |
| JP | 2005-259354 A | 9/2005 |
| JP | 2005-314207 A | 11/2005 |

OTHER PUBLICATIONS

Japanese Office Action (and English translation thereof) dated Aug. 5, 2008, issued in a counterpart Japanese Application.

U.S. Appl. No. 12/079,154, filed Mar. 25, 2008. First-named inventor Naotomo Miyamoto. Reacting apparatus comprising a plurality of reactors.

U.S. Office Action dated Mar. 31, 2010 issued in co-pending related U.S. Appl. No. 12/079,154.

* cited by examiner

REACTION DEVICE, HEAT-INSULATING CONTAINER, FUEL CELL DEVICE, AND ELECTRONIC APPARATUS

This application is a Divisional Application of U.S. application Ser. No. 11/646,030, filed Dec. 27, 2006, now U.S. Pat. No. 7,811,341 which is based upon and claims the benefit of priority from prior Japanese Patent Applications No. 2005-378549 and No. 2005-378505, filed on Dec. 28, 2005, and Japanese Patent Application No. 2006-338222, filed on Dec. 15, 2006, the entire contents of all of which are incorporated herein by reference.

BACKGROUND OF THE INVENTION

1. Field of the Invention

The present invention relates to a reaction device and a heat-insulating container, in particular, to a reaction device that integrates reactors requiring different operation temperatures such as a vaporizer, a reformer, a carbon monoxide remover, and the like that are used for a fuel cell device, to a heat-insulating container that houses reactors requiring different operation temperatures, and power generation device and electronic apparatus provided with the power generation device that includes the reaction device or the heat-insulating container.

2. Description of the Related Art

Recently, as a power source that is clean and has high energy conversion efficiency, fuel cell that uses hydrogen as fuel is coming in application to car vehicles, portable devices, and the like. Fuel cell is a device that makes fuel and oxygen in the atmosphere react electro-chemically, and generates electric energy from chemical energy directly.

As for fuel used in fuel cell, hydrogen can be mentioned. However, since hydrogen is in a gaseous state at ambient temperature, there is a problem concerning its handling and storage. In a case where liquid fuel such as alcohols and gasoline are used, a vaporizer to vaporize the liquid fuel, a reformer to take out hydrogen necessary for electric power generation by making the liquid fuel and high temperature water vapor go through a reforming reaction, a carbon monoxide remover to remove carbon monoxide which is a by-product of reforming reaction, and the like becomes in need.

SUMMARY OF THE INVENTION

Concerning such fuel cell device that reforms liquid fuel, while operation temperature of the vaporizer and the carbon monoxide remover is approximately 100 degrees Celsius to 180 degrees Celsius for example, the operation temperature of the reformer is approximately 300 degrees Celsius to 400 degrees Celsius for example. Thus, the difference in operation temperature is large. However, it was difficult to maintain temperature difference in the reaction device, since heat of the reformer propagates and temperature of the vaporizer and the carbon monoxide remover increases.

Therefore, a principal object of the present invention is to provide a heat-insulating container and a reaction device that are able to maintain temperature difference between reaction units in the reaction device that comprises two or more reaction units, and a fuel cell device and electronic apparatus that utilize the reaction device.

According to a first aspect of the present invention, there is provided a reaction device, comprising:

a reaction device main body that includes a first reaction unit and a second reaction unit;

a container to house the reaction device main body; and a first region that corresponds to at least the first reaction unit and a second region that corresponds to the second reaction unit, the first and second regions being provided to the container or internal side of the container; wherein the first reaction unit is set to a temperature higher than that of the second reaction unit, and the first region has a higher reflectivity than that of the second region, with respect to heat ray that is radiated from the reaction device main body.

According to a second aspect of the present invention, there is provided a reaction device, comprising:

a reaction device main body that includes a first reaction unit and a second reaction unit that have different temperatures from each other, the first reaction unit having a higher temperature than that of the second reaction unit;

a container to house the reaction device main body;

a first heat reflective film that is provided to an internal surface of the container and has a higher heat ray reflectivity than that of the container; and a second heat reflective film that is provided to a region, the region being internal side with respect to the first heat reflective film and corresponding to the first reaction unit, and the second heat reflective film having a higher heat ray reflectivity than that of the container.

According to a third aspect of the present invention, there is provided a reaction device, comprising:

a reaction device main body to perform reaction of reaction material; and a heat reflective film, provided so as to be opposed to an external surface of the reaction device main body, to reflect heat ray that is radiated from the reaction device main body, wherein a heat releasing portion, which transmits or absorbs at least a part of the heat ray that is radiated from the reaction device main body, is provided to the heat reflective film.

According to a fourth aspect of the present invention, there is provided a heat-insulating container, comprising:

a container to house a reaction device main body that includes a first reaction unit and a second reaction unit that have different temperatures from each other; and a first region and a second region, that have different heat ray reflectivity from each other, and are provided to the container or internal side of the container, wherein the first reaction unit has a higher temperature than that of the second reaction unit, the first region has a higher reflectivity than that of the second region, with respect to heat ray that is radiated from the reaction device main body, the first region is provided in correspondence with at least the first reaction unit, and the second region is provided in correspondence with the second reaction unit.

According to a fifth aspect of the present invention, there is provided a fuel cell device, comprising:

a reaction device main body that includes a first reaction unit and a second reaction unit;

a container to house the reaction device main body;

a first region that corresponds to at least the first reaction unit and a second region that corresponds to the second reaction unit, the first and second regions being provided to the container or internal side of the container; and a fuel cell that generates power by fuel generated by the reaction device main body; wherein the first reaction unit is set to a higher temperature than that of the second reaction unit, and the first region has a higher reflectivity than that of the second region, with respect to heat ray that is radiated from the reaction device main body.

According to a sixth aspect of the present invention, there is provided an electronic apparatus, comprising:

a reaction device main body that includes a first reaction unit and a second reaction unit;

a container to house the reaction device main body;

a first region that corresponds to at least the first reaction unit and a second region that corresponds to the second reaction unit, the first and second regions being provided to the container or internal side of the container;

a fuel cell that generates power by fuel generated by the reaction device main body; and an electronic apparatus main body that performs by electricity generated by the power generation cell, wherein the first reaction unit is set to a higher temperature than that of the second reaction unit, and the first region has a higher reflectivity than that of the second region, with respect to heat ray that is radiated from the reaction device main body.

BRIEF DESCRIPTION OF THE DRAWINGS

The above and further objects, features and advantages of the present invention will become more apparent from the following detailed description taken in conjunction with the accompanying drawings, wherein.

DETAILED DESCRIPTION OF THE PREFERRED EMBODIMENTS

Hereinafter, preferred embodiments concerning the present invention will be described with reference to the drawings. The embodiments given hereinafter have various kinds of technically preferred limitations to carry out the embodiments, the scope of the present invention is not limited to the given embodiments nor the figures given as an example, though.

First Embodiment

Figure 1:
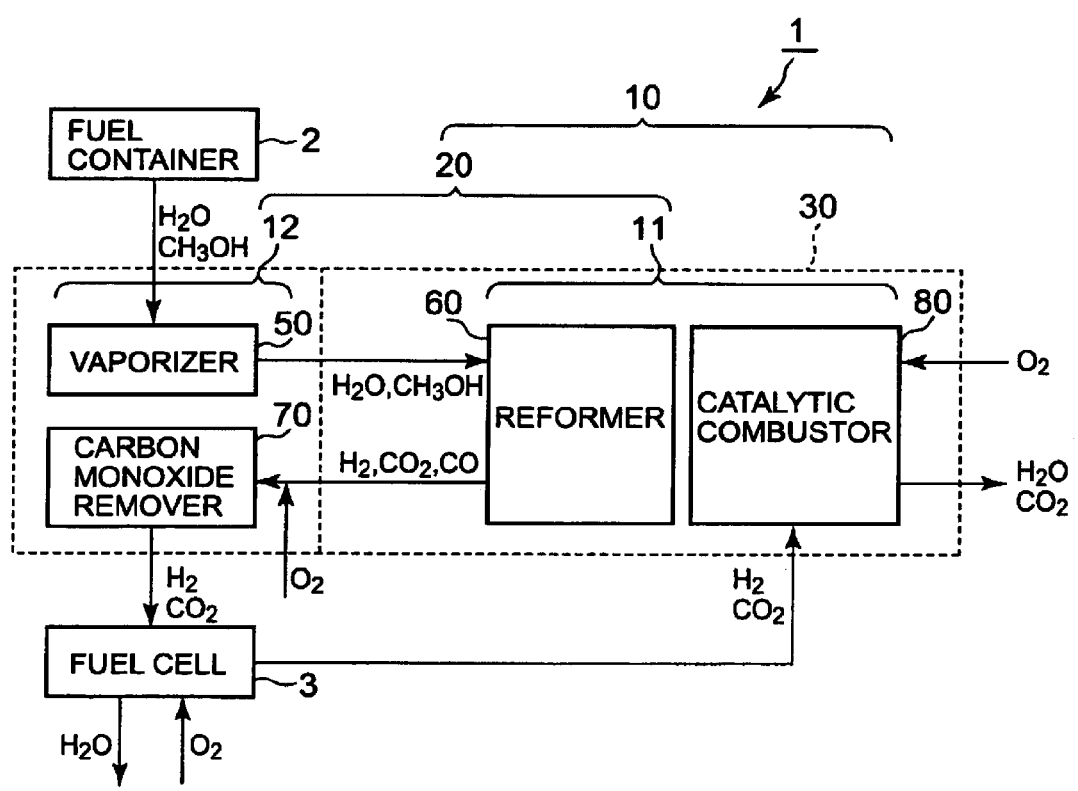
FIG. 1 is a block diagram of fuel cell device 1 according to a first embodiment of the present invention.

FIG. 1 is a block diagram of a fuel cell device 1 which is preferably applied with the present invention. The fuel cell device 1 is provided to a lap-top personal computer, a mobile phone, a personal digital assistant (PDA), an electronic notebook, a wrist watch, a digital still camera, a digital video camera, a game apparatus, an amusement apparatus, an electronic calculator, and other kinds of electronic apparatuses, and is used as a power source to operate electronic apparatus main body.

The fuel cell device 1 is provided with a fuel container 2, a reaction device 10, and a fuel cell 3. As described later, in a case where the reaction device 10 and the fuel cell 3 are housed in the electronic apparatus main body, the fuel container 2 is provided to the electronic apparatus main body detachably, and the fuel container 2 is attached to the electronic apparatus main body, the fuel and water in the fuel container 2 may be supplied to the reaction device 10 by a pump.

The fuel container 2 stores fuel and water, and supplies solution mixture of the fuel and water to the reaction device 10 by a micro pump not shown. As for the fuel that is stored in the fuel container 2, liquid fuel of hydrocarbon type can be applied. In particular, alcohols such as methanol and ethanol, ethers such as dimethyl ether, and gasoline can be mentioned. In the fuel container 2, fuel and water may be stored separately, or may be stored as a mixture.

Here, the following explanation will be given for the case where methanol is used as fuel. However, other compounds may be used.

The reaction device 10 comprises a reaction device main body 20 and a heat-insulating container 30, in which the reaction device main body 20 is housed.

The reaction device main body 20 includes a first reaction unit 11 and a second reaction unit 12. The first reaction unit 11 includes a reformer 60, a catalytic combustor 80, and a high-temperature heater not shown. The second reaction unit 12 comprises a vaporizer 50, a carbon monoxide remover 70, and a low-temperature heater not shown.

The vaporizer 50 vaporizes fuel and water supplied from the fuel container 2. The reformer 60 reforms the vaporized fuel and water vapor supplied from the vaporizer 50, through a reforming reaction with a catalyst, and generates gaseous mixture that includes hydrogen. (Here in FIG. 1, a structure in which the vaporizer 50 is arranged inside the heat-insulating container 30 is shown. However, it may be a structure in which the vaporizer 50 is arranged at outside the heat-insulating container 30.) In a case where methanol is used as the fuel, gaseous mixture of hydrogen gas and carbon dioxide gas as main product and small amount of carbon monoxide gas as by-product is generated through a reforming reaction as given in the following reaction equations (1) and (2).

To the carbon monoxide remover 70, in addition to the gaseous mixture supplied from the reformer 60, air is supplied. The carbon monoxide remover 70 removes the carbon monoxide included in the gaseous mixture, by selectively oxidizing the carbon monoxide through a carbon monoxide removing reaction as given in the reaction equation (3) with a catalyst. Hereinafter, gaseous mixture that is removed of the carbon monoxide is referred to as reformed gas.

$$CH_3OH+H_2O \rightarrow 3H_2+CO_2 \quad (1)$$

$$H_2+CO_2H_2O \rightarrow CO \quad (2)$$

$$2CO+O_2 \rightarrow 2CO_2 \quad (3)$$

The fuel cell 3 generates electric energy by electrochemical reaction of hydrogen contained in the reformed gas. The fuel cell 3 is provided with an anode that supports catalytic particles, a cathode that supports catalytic particles, and a solid polyelectrolyte film arranged in between the anode and the cathode, that are not shown. To the anode side of the fuel cell 3, reformed gas is supplied from the carbon monoxide remover 70. Hydrogen gas contained in the reformed gas is separated into hydrogen ions and electrons by the catalyst (catalytic particles) provided on the anode, as given in electrochemical reaction equation (4). Hydrogen ions move toward the cathode side by going through electrolyte film, and electrons move to the anode through an external circuit. At the cathode side, water is generated through a chemical reaction by the hydrogen ions that go through the electrolyte film, the electrons that are supplied from the cathode through the external circuit, and oxygen gas supplied from external atmosphere, as given in electrochemical reaction equation (5). Electric energy can be taken from potential difference between the anode and the cathode.

$$H_2 \rightarrow 2H^+ + 2e^- \quad (4)$$

$$2H^+ + 2e^- + \tfrac{1}{2}O_2 \rightarrow H_2O \quad (5)$$

Gaseous mixture that includes hydrogen gas that is left un-reacted by the aforementioned electrochemical reaction equation (4) at the anode side (hereinafter referred to as off-gas) is supplied to catalytic combustor 80.

The catalytic combustor 80 combines oxygen to fuel and water supplied from the fuel container 2, or to the off-gas, and performs combustion to heat the first reaction unit 11 to 250 degrees Celsius or higher (first temperature), for example approximately 250 degrees Celsius to 400 degrees Celsius. The high-temperature heater heats the first reaction unit 11 instead of the catalytic combustor 80 at start-up, and the low-temperature heater heats the second reaction unit 12 to approximately 110 degrees Celsius to 190 degrees Celsius (second temperature) at start-up.

Figure 2:
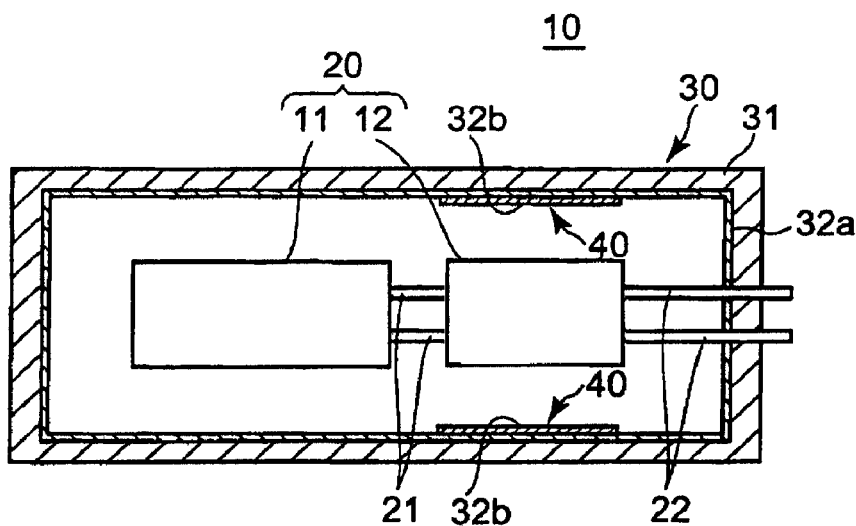
FIG. 2 is a cross-sectional view of a reaction device 10 according to the first embodiment of the present invention.

FIG. 2 is a cross-sectional view of reaction device 10 according to the first embodiment of the present invention.

The first reaction unit 11 and the second reaction unit 12 are housed in heat-insulating container 30 described later. In between the first reaction unit 11 and the second reaction unit 12, pipe 21 that serves as flow passage of reaction material (reactant) and product material(product) is provided (refer to FIG. 2). In addition, pipe 22 to let the reaction material flow in from external of the heat-insulating container 30, and to let product material flow out of the heat-insulating container 30, is provided to the second reaction unit 12 (refer to FIG. 2).

The first reaction unit 11, the second reaction unit 12, and the pipes 21 and 22 may be formed by attaching together metal plates such as stainless steel (SUS 304), Kovar alloy, and the like. Alternatively, they may be formed by attaching together glass substrate and the like.

Next, the heat-insulating container 30 that house the reaction device main body 20 is described. The heat-insulating container 30 has a rectangular solid shape, and the first reaction unit 11 and the second reaction unit 12 are housed inside. The first reaction unit 11 and the second reaction unit 12 are connected through the pipe 21. The first reaction unit 11 and the second reaction unit 12 are fixed by the pipe 22 that penetrates through the heat-insulating container 30.

Package 31 of the heat-insulating container 30 can be formed by attaching together metal plates such as stainless steel (SUS 304), Kovar alloy, and the like, or glass substrates and the like. Internal space of the heat-insulating container 30 is kept at low pressure (0.03 Pa or lower) to prevent thermal conduction and convective flow by gas molecules.

Figure 7:
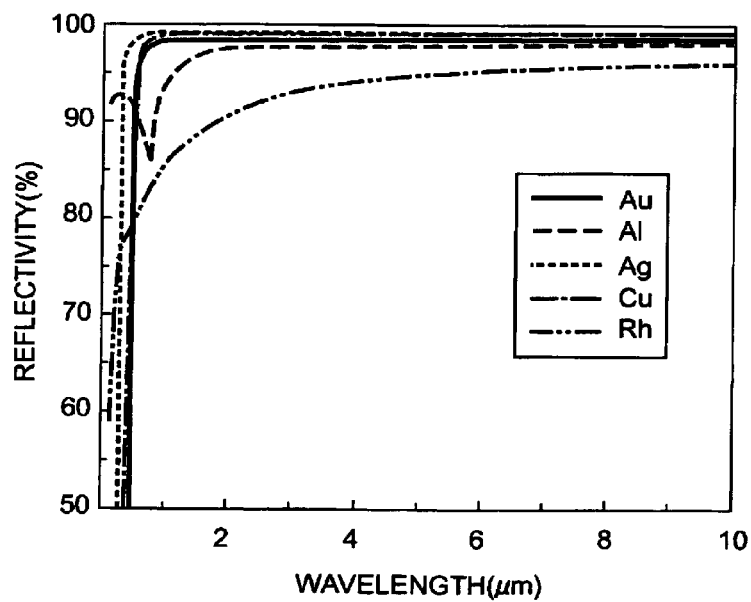
FIG. 7 is a graph showing reflectivity with respect to wavelength, for Au, Al, Ag, Cu, and Rh.

In addition, to the surface of internal wall of the package 31, a heat reflective film 32a to reflect infrared ray (heat ray) is formed to suppress heat loss from the reaction device main body 20 due to radiation. As for the heat reflective film 32a, as shown in FIG. 7 described later, metal with high reflectivity with respect to infrared ray, such as gold (Au), aluminum, silver, or copper, can be used for example. The heat reflective film 32a can be formed by forming a metal film using a gas phase method such as sputter method, vacuum deposition method, and the like. Here, in a case where the heat reflective film 32a is formed with gold, a base layer of chromium or titanium may be formed as an adhesive layer.

Accordingly, heat loss from the reaction device main body 20 to the external of the heat-insulating container 30 can be suppressed.

Heat is conducted from the first reaction unit 11 to the second reaction unit 12 through the pipe 21. Therefore, in a case where the amount of heat conducted from the first reaction unit 11 to the second reaction unit 12 through the pipe 21 exceeds the amount of heat conducted to the heat-insulating container 30 through the pipe 22, there is a fear in that temperature of the second reaction unit 12 rises to a higher temperature than a suitable temperature. Thus, to the surface of internal wall of the heat-insulating container 30 according to the present embodiment, a heat releasing portion 40 is provided to a portion that corresponds to the second reaction unit.

The heat releasing portion 40 is a region that has high absorbing rate with respect to infrared ray, compared to other region of the surface of the internal wall of the package 31. Thus, the heat releasing portion 40 absorbs infrared ray radiated from the second reaction unit 12 and lets it go under thermal conduction to the heat-insulating container 30. Accordingly, amount of heat that is released from the second reaction unit 12 by radiation (heat leakage) is enhanced, and temperature increase of the second reaction unit 12 can be suppressed.

The heat releasing portion 40 is, as shown in FIG. 2 for example, formed by providing a heat absorbing film 32b that absorbs infrared ray, to the internal side of the heat reflective film 32a that is opposed to the surface of the external wall where pipes 21 and 22 of the second reaction unit 12 are not provided.

Hereinafter, materials used as the heat absorbing film 32b, its film thickness, and the like are studied.

[1] Study on Reflectivity

First of all, reflectivity of the heat releasing portion 40 is studied.

Figure 3:
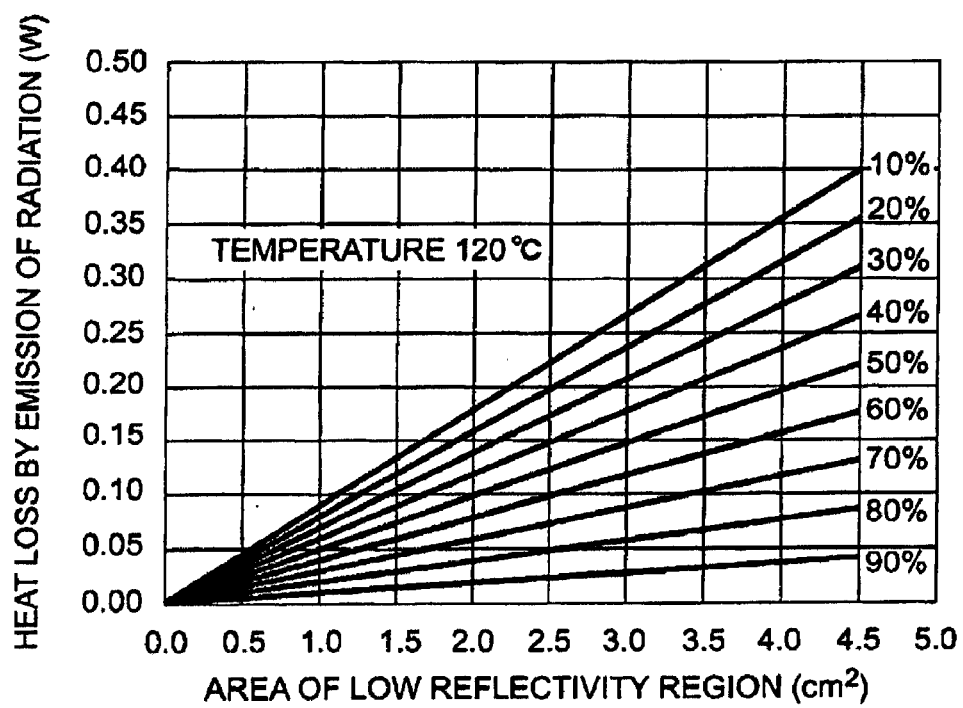
FIG. 3 is a graph showing a relation among reflectivity, area, and heat loss by emission of radiation from heat releasing portion 40.

FIG. 3 is a graph showing a relation between area of the heat releasing portion 40 and its heat leakage (calculated value), when reflectivity of the heat releasing portion 40 is varied by 10% from 10% to 90% (Graphs for 20% through 90% are calculated in accordance with the value of the graph for 10%.). Here, it is assumed that the absorption coefficient of the heat absorbing film 32b is large enough, and there is no infrared ray that is transmitted through the heat absorbing film 32b, is reflected by the base material or the heat reflective film 32a, and is transmitted through the heat absorbing film 32b again to re-enter the heat-insulating container 30.

Here, the size of the second reaction unit 12 is set to 1.0 cm×2.5 cm×0.3 cm, and the distance between the second reaction unit 12 and the heat-insulating container 30 is set to 0.5 cm. Further, influx of heat from the pipe 21 and efflux of heat from the pipe 22 are both set to 0.90 W, and the initial temperature of the second reaction unit 12 was set to 120 degrees Celsius.

The heat loss from the heat releasing portion 40 by emission of radiation varies by the reflectivity of the heat releasing portion 40 and is proportional to the area of the heat releasing portion 40. Therefore, by setting the reflectivity and the area suitably with respect to the heat loss from the heat releasing portion by emission of radiation, temperature distribution of the reaction device main body 20 can be made to a desired state.

For example, it can be obtained that, in a case where the reflectivity of the heat releasing portion 40 is 10%, and when the area of the heat releasing portion 40 is 4.0 cm$^2$, heat leakage is approximately 0.35 W, and the temperature of the second reaction unit 12 lowers by approximately 40 degrees Celsius and becomes approximately 80 degrees Celsius.

The heat releasing portion 40 is formed in a rectangle shape in the present embodiment, and the area of the heat releasing portion 40 is the same as the area that corresponds to the second reaction unit 12, for example.

[2] Study on Absorption Coefficient and Film Thickness

Next, absorption coefficient and film thickness of the heat absorbing film 32b, in a case where the heat absorbing film 32b is applied to the base material of the package 31 or to the heat reflective film 32a as the heat releasing portion 40, are studied.

Figure 4:
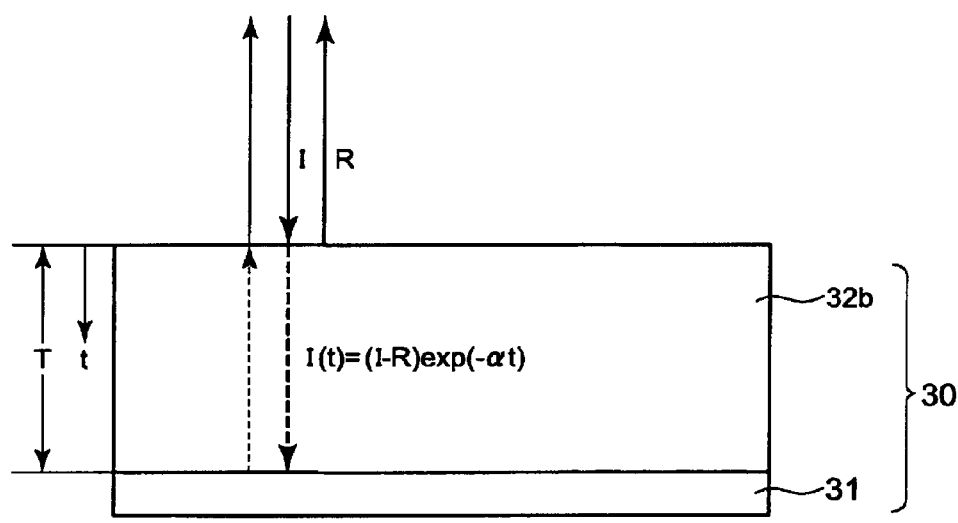
FIG. 4 is a frame format showing a relation among infrared rays that enter, are reflected by, and are transmitted in heat absorbing film 32b.

FIG. 4 is a frame format showing a relation among infrared rays that enter, are reflected by, and are transmitted in heat absorbing film 32b.

Here, as shown in FIG. 4, by expressing the intensity of the infrared ray that enters the heat absorbing film 32b as I, the intensity of the infrared ray that is reflected at the surface of the heat absorbing film 32b as R, the absorption coefficient of the heat absorbing film 32b as a, and the distance (depth) from the surface of the heat absorbing film 32b as t, the intensity of the infrared ray that is transmitted through the heat absorbing film 32b at the location of distance (depth) t, I(t), can be expressed by the following equation.

$$I(t)=(I-R)\exp(-\alpha t)$$

Figure 5:
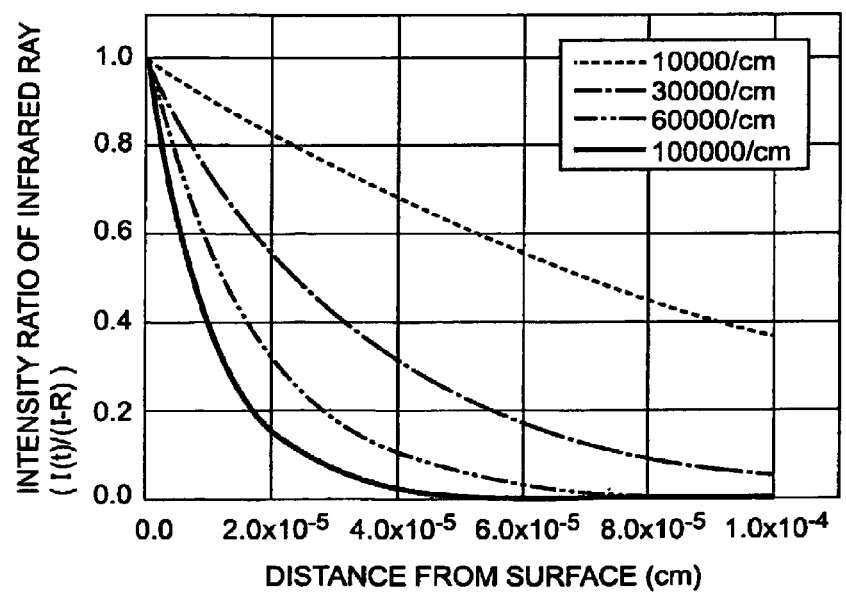
FIG. 5 is a graph showing relation between t and I(t)/(I−R)

FIG. 5 shows a relation between t and $I(t)/(I-R)$ (=$\exp(-\alpha t)$), when $\alpha$ is varied as 10000/cm, 30000/cm, 60000/cm, and 100000/cm.

When $\alpha$ is 100000/cm and t is approximately 230 nm, the intensity of the infrared ray that is transmitted through the heat absorbing film 32b is less than 10%. That is, when $\alpha t$ is more than approximately 2.3, the intensity of the infrared ray that is transmitted through the heat absorbing film 32b becomes less than 10%, and the infrared ray that is further reflected by the base material or the heat reflective film 32a and is transmitted through the heat absorbing film 32b again to re-enter the heat-insulating container 30 becomes less than 1%. Therefore, a film with film thickness T that meets the condition of $\alpha T$>approximately 2.3 is suitable for the heat absorbing film 32b.

On the other hand, when $\alpha$ is 100000/cm and t is 25 nm, that is, when $\alpha t$ is 0.25, the intensity of the infrared ray that is transmitted through the heat absorbing film 32b becomes approximately 78%, and the infrared ray that is further reflected by the base material or the heat reflective film 32a and is transmitted through the heat absorbing film 32b to re-enter the heat-insulating container 30 becomes approximately 61%. Thus, it is not suitable for the heat absorbing film 32b.

[3] Study on Radiation Wavelength

Figure 6:
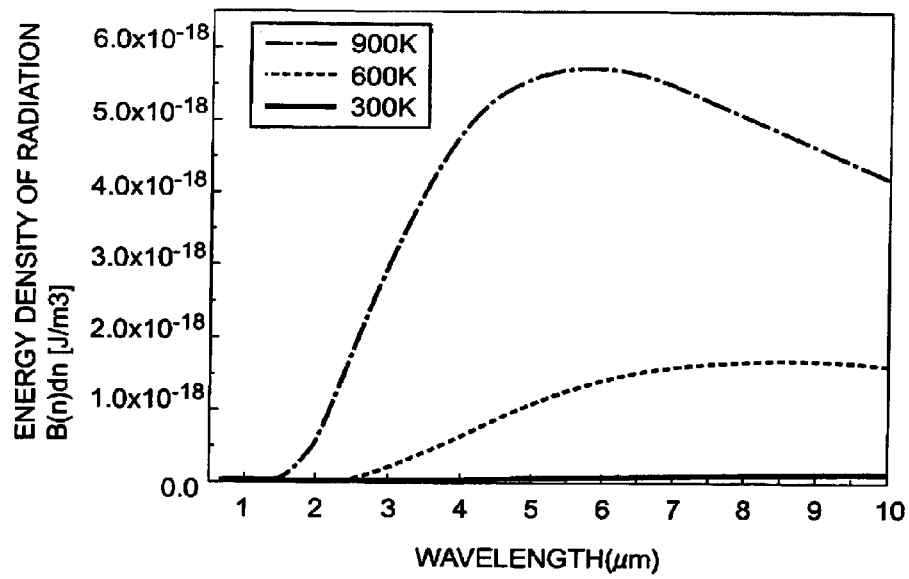
FIG. 6 is a graph showing a relation between wavelength of black-body radiation and energy density of radiation.

Next, wavelength of black-body radiation that is radiated from the reaction device main body 20 is studied. FIG. 6 is a graph showing relation between the wavelength of black-body radiation and energy density of radiation, at temperatures of 300 K (27 degrees Celsius), 600 K (327 degrees Celsius), and 900 K (627 degrees Celsius). It became obvious that at 600 K, energy density of radiation becomes high with wavelength of 2 μm or more (0.6 eV or less), and at 900 K, energy density of radiation becomes high with wavelength of 1.24 μm or more (1 eV or less). Therefore, it is required that reflectivity of the heat releasing portion 40 is low for infrared ray with wavelength of 1.24 μm or more.

[4] Study on Metal Material and Half-metallic Material

Metal materials and half-metallic materials have high reflectivity in general. However, the absorption coefficient at most wavelengths is 10$^5$/cm or more. Therefore, it can be considered as a candidate for the heat absorbing film 32b, by making the film thickness to 230 nm. Accordingly, reflectivity of metal materials and half-metallic materials are studied.

FIG. 7 shows reflectivity with respect to wavelength for Au, Al, Ag, Cu, and Rh. Among these, reflectivity of Rh is comparatively low in the region with wavelength of 1.24 μm or more, thus Rh can be considered as a candidate for the heat absorbing film 32b.

Other than Rh, as for metal that have low reflectivity at wavelength of 1.24 μm, Fe (reflectivity 75%), Co (reflectivity 78%), Pt (reflectivity 78%), Cr (reflectivity 63%), and the like can be mentioned as a candidate for the heat absorbing film 32b.

In addition, as for half-metallic material with low reflectivity, graphite (layered carbon) can be mentioned. Reflectivity of graphite is as low as 42% with wavelength of 1.24 μm, and 47% with wavelength of 2 μm. Thus, it can be used as a material of the heat absorbing film 32b. Further, carbon material that is called activated carbon is poor in crystallization property, and its layer structure is disordered. However, this may also be a candidate as a material for the heat absorbing film 32b.

Here, regarding any metal films among Au, Al, Ag, and Cu, reflectivity of infrared ray (wavelength of 5 to 30 μm) that is generated in the temperature region of several hundred degrees Celsius, which is the operation temperature of the first reaction unit 11, is approximately 100%. Therefore, any metal film among Au, Al, Ag, and Cu is suitable for the heat reflecting film 32a.

[5] Study on Non-Metallic Material

Many of semiconductors have reflectivity ranging in 10% to 20% or less, in the region of wavelength with 1.24 μm or more. Therefore, it may be considered as a suitable material for the heat absorbing film 32b. However, in most cases, absorption coefficient is extremely small as less than 1/cm.

However, amorphous semiconductor that has dangling bond has high absorption coefficient, and thus can be considered to be capable of being used as a material for the heat absorbing film 32b. For example, with respect to amorphous silicon that has a large number of dangling bonds, absorption coefficient becomes 1000/cm or larger, thus amorphous silicon can be used as a material for the heat absorbing film 32b.

Figure 8:
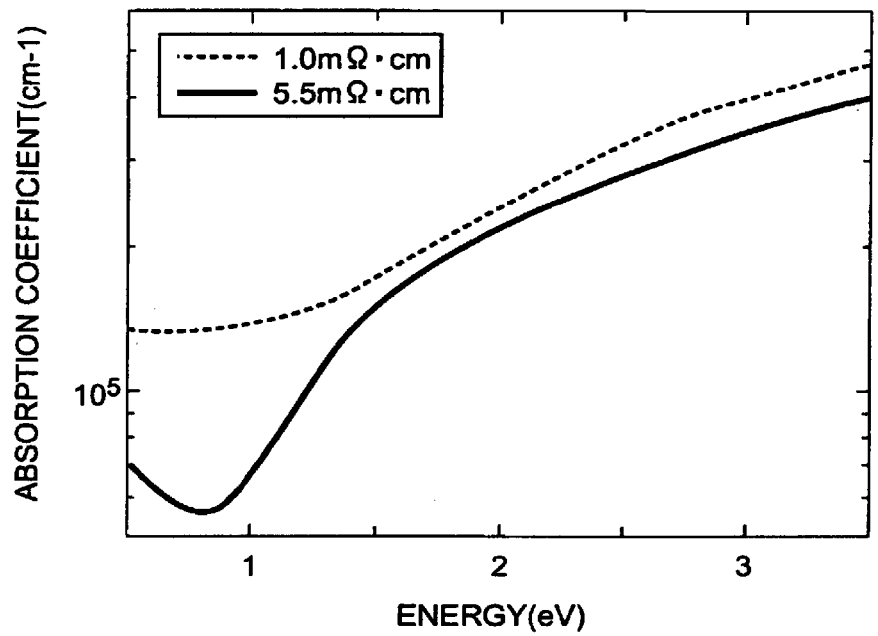
FIG. 8 is a graph showing result of measuring absorption coefficient with respect to Ta—Si—O—N type film.

In addition, as an amorphous semiconductor material that is more suitable for the heat absorbing film 32b, film of Ta—Si—O—N type can be mentioned. FIG. 8 shows a result of measuring absorption coefficient (cm$^{-1}$) for 0.5 to 3.5 eV (wavelength of approximately 2.48 μm to 350 nm) with respect to film of Ta—Si—O—N type, with resistance of 1.0 mΩ·cm and 5.5 mΩ·cm. As for the film with resistance of 1.0 mΩ·cm, absorption coefficient in this measurement range is approximately 100000/cm or more, thus the film with resistance of 1.0 mΩ·cm can be used as a material for the heat absorbing film 32b.

Further, the applicant has found that film of Ta—Si—O—N type with mole ratio in the range of approximately 0.6<Si/Ta<approximately 1.0 and approximately 0.15<N/O<approximately 4.1 has absorption coefficient of approximately 100000/cm or more when resistance is 2.5 mΩ·cm or less. Therefore, the above material can also be used as a material for the heat absorbing film 32b.

As described, according to the present embodiment, heat release from the reaction unit with lower temperature is enhanced, and difference in temperatures between the reaction units of the reaction device comprising two or more reaction units can be maintained.

Modification Example 1

Figure 9:
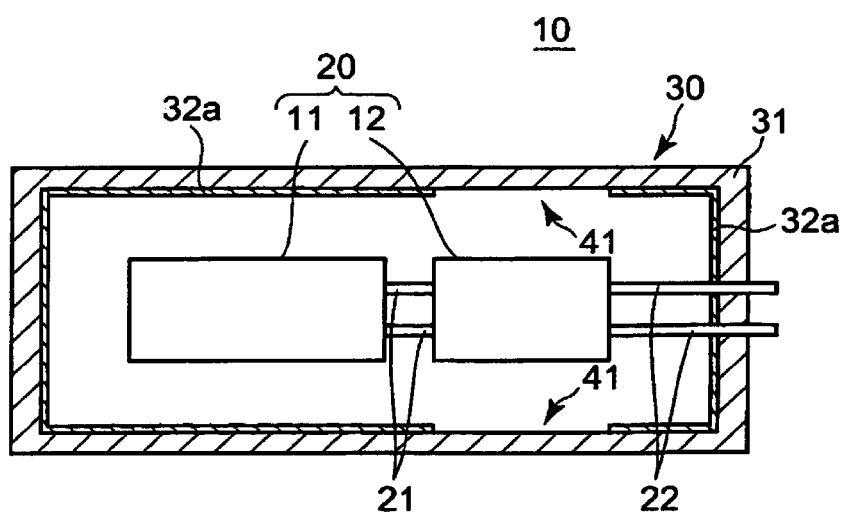
FIG. 9 is a cross-sectional view showing a modification example of the heat-insulating container 30.

In the aforementioned embodiment, heat releasing portion 40 was provided by setting a heat absorbing film 32b on the heat reflective film 32a. However, as shown in FIG. 9, an opening portion, where base material of the heat-insulating container is exposed, may be formed by not providing the heat reflective film 32a to a portion of a surface of internal wall of the package 31. The opening portion works as the heat releasing portion 41. In this case, the reflectivity of the opening portion is the reflectivity of the package 31.

Here, in a case where the package 31 is a glass substrate, most of the infrared ray is transmitted through the package 31. Therefore, reflectivity of the opening portion becomes relatively lower compared to that of the portion where the package 31 overlaps with the heat reflective film 32a, where it is not the opening portion.

Modification Example 2

Figure 10:
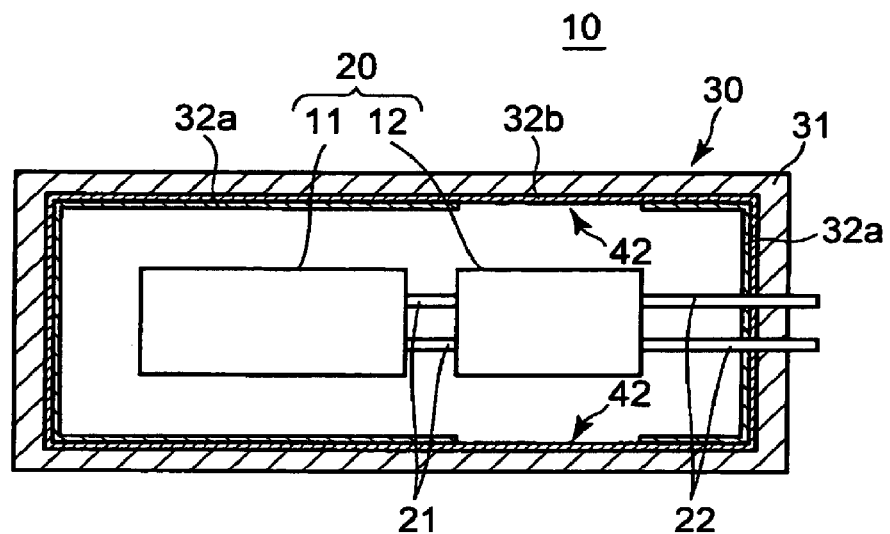
FIG. 10 is a cross-sectional view showing a modification example of the heat-insulating container 30.

Alternatively, as shown in FIG. 10, the heat absorbing film 32b may be provided to the entire surface of the internal wall of the package 31, and the heat reflective film 32a may be provided on the heat absorbing film 32b with some exceptional portion, thus opening portion where the heat absorbing film 32b is exposed may becomes the heat releasing portion 42.

Modification Example 3

Figure 11:
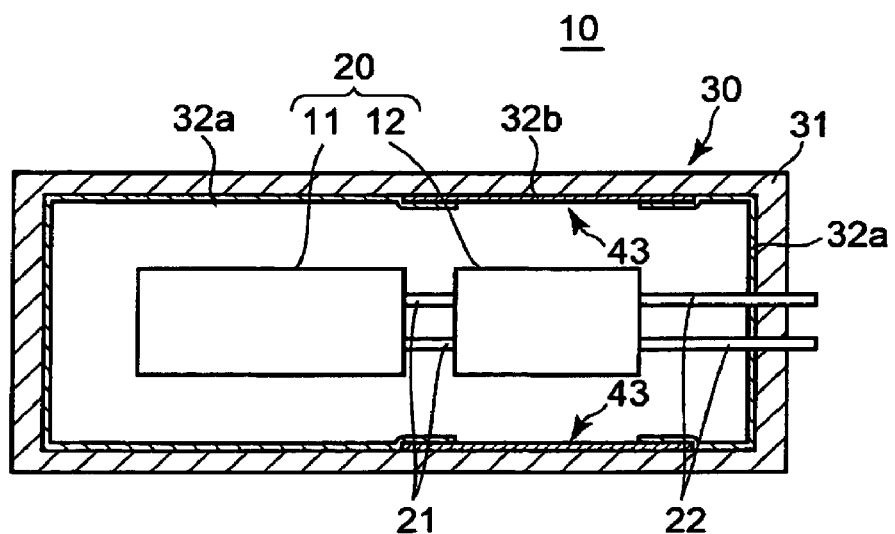
FIG. 11 is a cross-sectional view showing a modification example of the heat-insulating container 30.

In addition, as shown in FIG. 11, the heat absorbing film 32b may be partly provided to a surface of the internal wall of the package 31, and the heat reflective film 32a may be provided to the other portion of the surface of the internal wall of the heat-insulating container. Thus opening portion where the heat absorbing film 32b is exposed works the heat releasing portion 43. Here, the periphery of the heat absorbing film 32b and the heat reflective film 32a may overlap partially.

Modification Example 4

Figure 12:
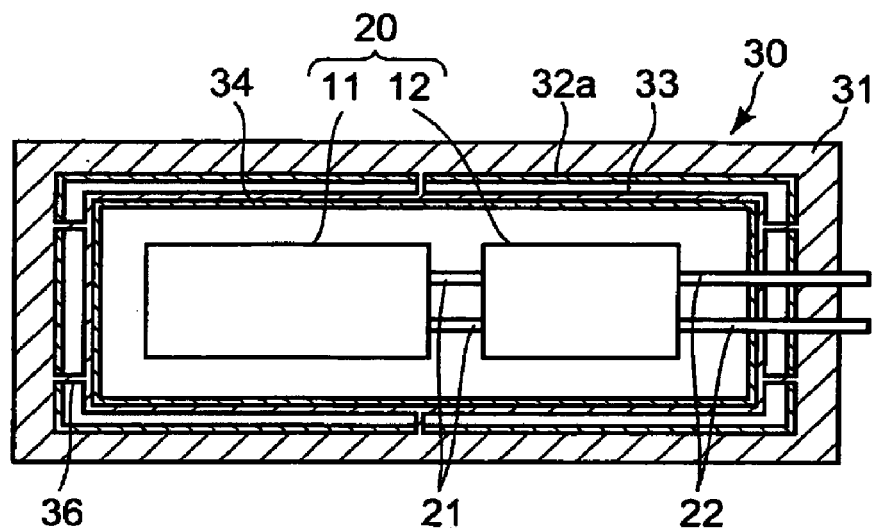
FIG. 12 is a cross-sectional view showing (a comparative example of) a modification example of the heat-insulating container 30.

When the reaction temperature of the reaction device main body 20 exceeds 600 degrees Celsius, increase of energy density of radiation becomes prominent (refer to FIG. 6). Therefore, single layer of the heat reflective film 32a becomes insufficient, thus a structure with double layer is considered. That is, as shown in FIG. 12, a second heat reflective film 34 is provided by opening a gap 33 on the inner side of the external heat reflective film 32a. The gap 33 is formed by a supporting member 36 comprising the same material as the package 31, for example. By opening the gap 33, thermal conduction from the second heat reflective film 34 to the first heat reflective film 32a can be prevented, thus thermal insulation efficiency can be improved.

Figure 13:
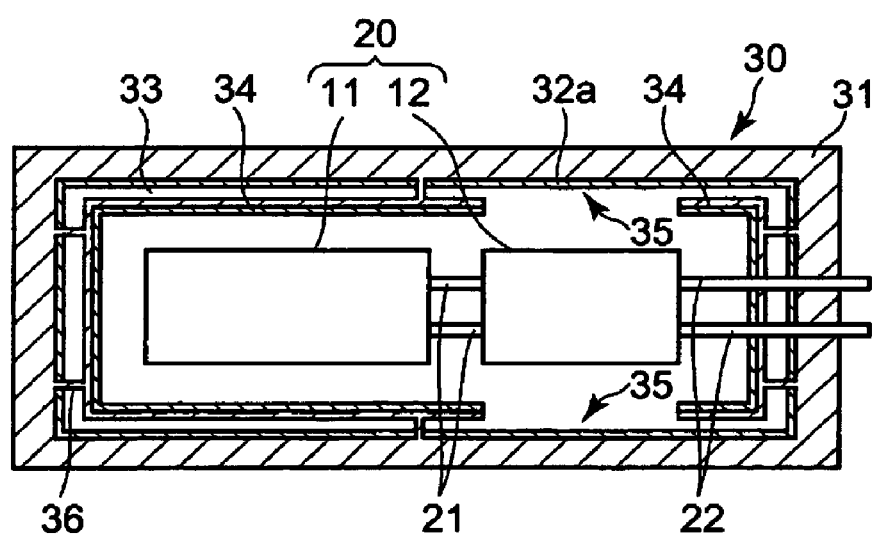
FIG. 13 is a cross-sectional view showing a modification example of the heat-insulating container 30.

In this case, as shown in FIG. 13, heat releasing window 35 may be provided to a portion of the second heat reflective film 34, where it corresponds to the second reaction unit 12. With the heat releasing window 35 provided, emission of radiation from the second reaction unit 12 is prevented only by the external heat reflective film 32a. Therefore, heat release from the second reaction unit 12 can be enhanced compared to the first reaction unit 11, from which radiation is prevented by double layers of heat reflective films 32a and 34.

Modification Example 5

In the aforementioned embodiment, heat releasing portions of 40 through 43 were provided to the surface of the internal wall of the package 31, which is opposed to the surface of the external wall of the second reaction unit 12 where pipes 21 and 22 are not provided. And, heat loss by emission of radiation from the second reaction unit 12 may be adjusted by regulating area of the heat releasing portions of 40 through 43.

Figure 14:
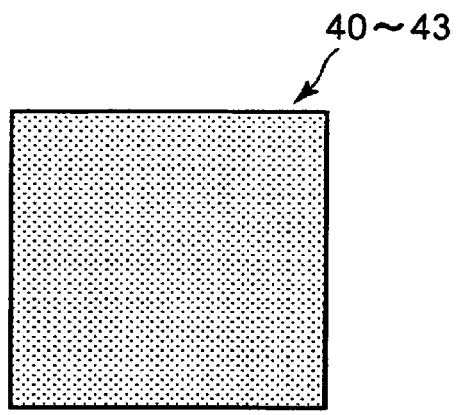
FIG. 14 is a frame format showing shapes of heat releasing portions 40 through 43.
Figure 15:
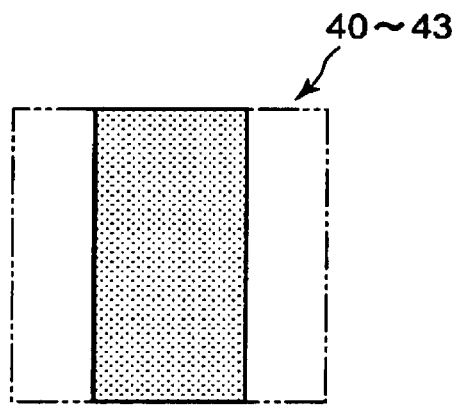
FIG. 15 is a frame format showing shapes of the heat releasing portions 40 through 43.
Figure 16:
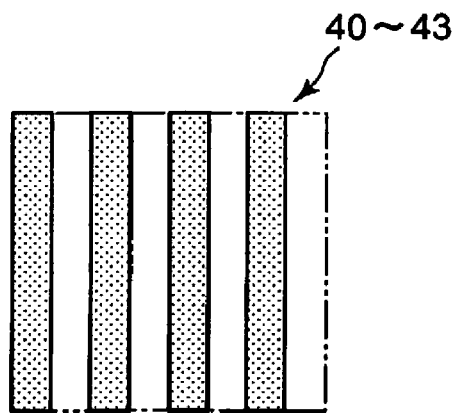
FIG. 16 is a frame format showing shapes of the heat releasing portions 40 through 43.
Figure 17:
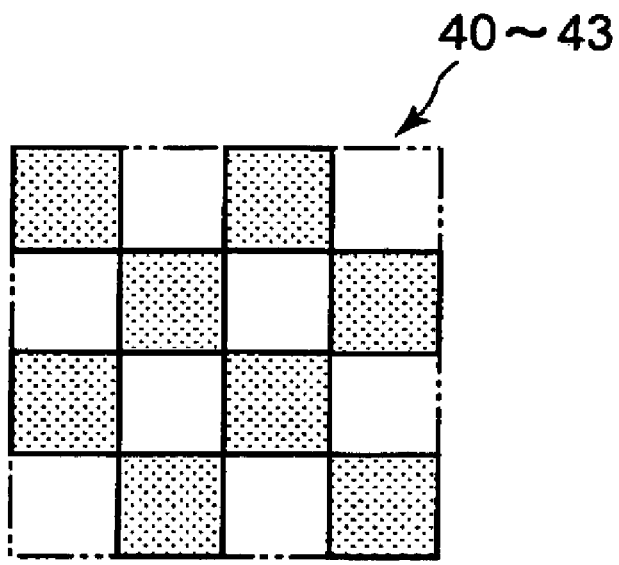
FIG. 17 is a frame format showing shapes of the heat releasing portions 40 through 43.

Here, supposing that the shape of the heat releasing portions 40 through 43, which is opposed to a surface of the external wall of the second reaction unit 12 where pipes 21 and 22 are not provided, can be made so as to have the same area as the second reaction unit 12 (FIG. 14), temperature of the second reaction unit 12 can be made uniform. However, in a case where shape or size is different (for example, FIG. 15), temperature of the second reaction unit 12 becomes uneven. Here, region shown by solid line in FIG. 14 and range shown by two-dot chain line in FIGS. 15 through 18 are the shape that is opposed to and is the same with the surface of the external wall of the second reaction unit 12.

In order to decrease the area of the heat releasing portions 40 through 43 and also keep the temperature of the second reaction unit 12 uniform, it is preferable to provide the heat releasing portions 40 through 43 in the region, in a uniformly dispersed manner. For example, the heat releasing portions 40 through 43 may be provided in a stripe shape (FIG. 16), in a checker board shape (FIG. 17), or the like.

Figure 18:
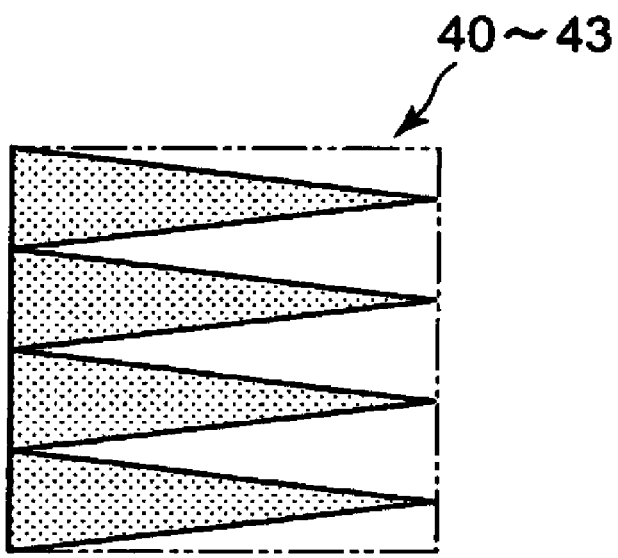
FIG. 18 is a frame format showing shapes of the heat releasing portions 40 through 43.

In addition, temperature of the second reaction unit 12 tends to be high in the side where pipe 21 that conducts heat from the first reaction unit 11 is provided, and tends to be low in the side where pipe 22 that conducts heat to the heat-insulating container 30 is provided. Therefore, as shown in FIG. 18 for example, heat releasing portions 40 through 43 may be provided so that the distribution of the heat releasing portions 40 through 43 is larger on the side where pipe 21 is provided (left side in FIG. 18), and the distribution of the heat releasing portions 40 through 43 is smaller on the side where pipe 22 is provided (right side in FIG. 18). By providing the heat releasing portions 40 through 43 in such manner, amount of heat release of the higher-temperature side where pipe 21 is provided, is larger. And amount of heat release of the lower-temperature side where pipe 22 is provided is smaller. As a result, temperature gradient can be suppressed.

Second Embodiment

Next, second embodiment according to the present invention is described.

Figure 19:
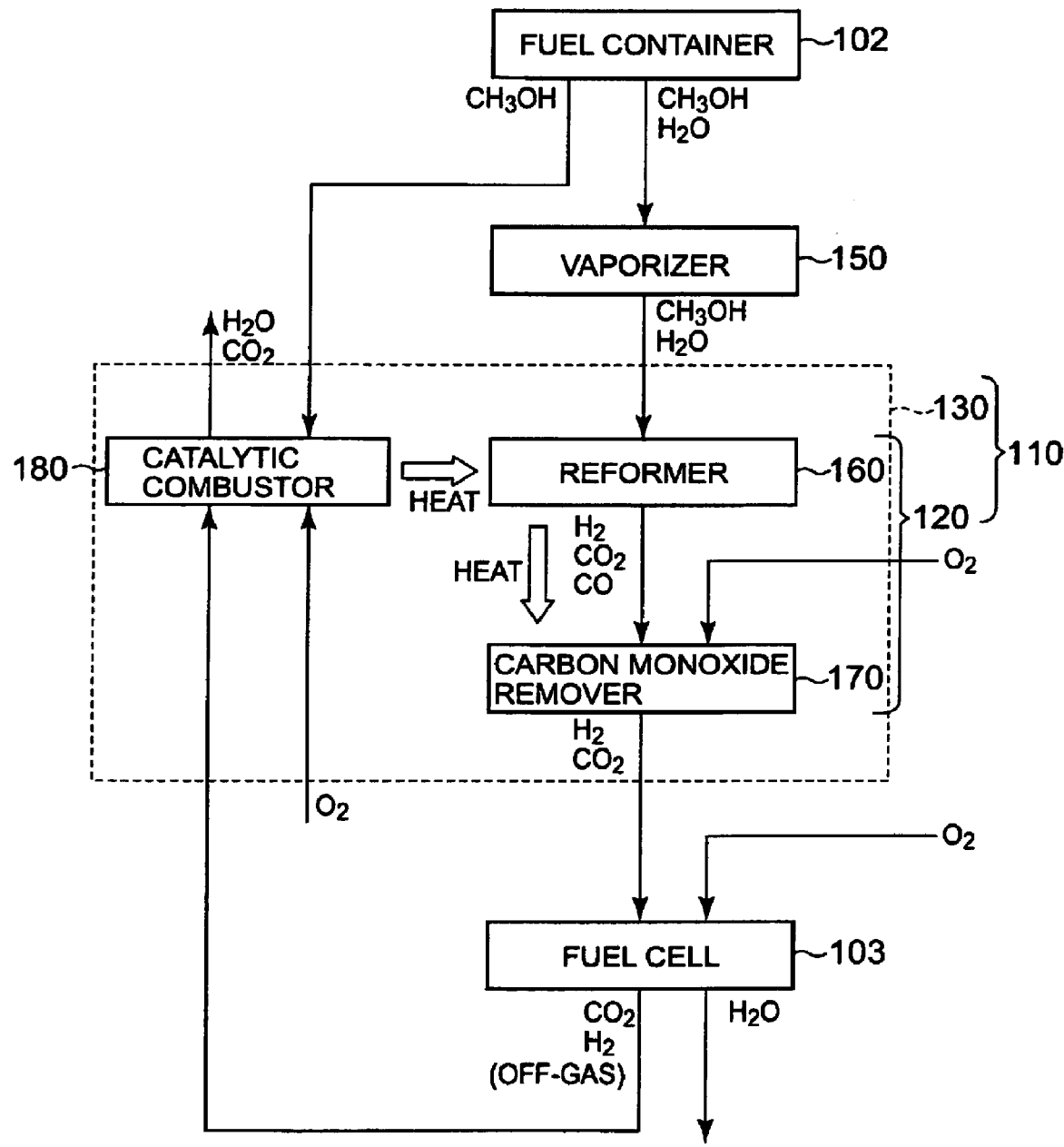
FIG. 19 is a block diagram showing a fuel cell device 101 according to a second embodiment of the present invention.

FIG. 19 is a block diagram showing an outline structure of fuel cell device 101 that is applied with the reaction device of the present embodiment according to the present invention. As shown in the figure, the fuel cell device 101 is provided with a fuel container 102, a vaporizer 150, a reaction device 110, and a fuel cell 103.

Though it is not shown in figure, the vaporizer 150 has a structure in which two substrates are attached, and to at least one attaching surface of these substrates, that is, to the inner surface, a micro flow passage is formed in a zigzag manner. Further, to the external surface of each substrate, a thin film heater comprising an electrical heating material such as heat-generating resister, heat-generating semiconductor that generates heat by being applied with voltage, is provided. By this thin film heater, fuel and water that are supplied from the fuel container 102 to the micro flow passage in the vaporizer 150 are heated and vaporized.

The reaction device 110 generates hydrogen from vaporized fuel and water vapor supplied from the vaporizer 150, and comprises a reformer 160, a carbon monoxide remover 170, a reaction device main body 120 provided with a catalytic combustor 180, and a heat-insulating container 130. With respect to the performance of the reformer 160, the carbon monoxide remover 170, the catalytic combustor 180, and the heat-insulating container 130, they are the same as the reformer 60, the carbon monoxide remover 70, the catalytic combustor 80, and the heat-insulating container 30 of the first embodiment. Therefore, explanation will be omitted.

Detail on the aforementioned reaction device 110 will be provided later. The reaction device 110 is a device that has the reformer 160, the carbon monoxide remover 170, the catalytic combustor 180, and the heat-insulating container 130 integrated together. Combustion heat generated at the catalytic combustor 180 is supplied to the reformer 160, and thus the reformer 160 is set to a predetermined temperature (first temperature). Carbon monoxide remover 170 is set to a predetermined temperature (second temperature) that is lower than the temperature of the reformer 160, by thermal conduction through connection portion 121 (described later) that connects the reformer 160 and the carbon monoxide remover 170. Accordingly, chemical reactions of the aforementioned chemical reaction equations (1) through (3) are performed. Here, a structure in which another vaporizer that is not shown is arranged in between the fuel container 102 and the catalytic combustor 180, a part of the fuel is vaporized by this vaporizer, and then supplied to the catalytic combustor 180, may be further provided.

As for the performance of the fuel cell 103, since it is the same with the fuel cell 3 of the first embodiment, explanation is omitted.

The aforementioned fuel cell device 101 is, in a similar manner as the fuel cell device 1 of the first embodiment, provided to a lap-top personal computer, a mobile phone, a personal digital assistant (PDA), an electronic notebook, a wrist watch, a digital still camera, a digital video camera, a game apparatus, an amusement apparatus, an electronic calculator, and other kinds of electronic apparatuses, and is used as a power source to operate electronic apparatus main body. Here, in a case where the reaction device 110, the vaporizer 150, and the fuel cell 103 of the fuel cell device 101 are housed in the electronic apparatus main body, the fuel container 102 is provided to the electronic apparatus main body detachably, and the fuel container 102 is attached to the electronic apparatus main body, the fuel and water in the fuel container 102 may be supplied to the reaction device 110 by a pump.

Figure 20:
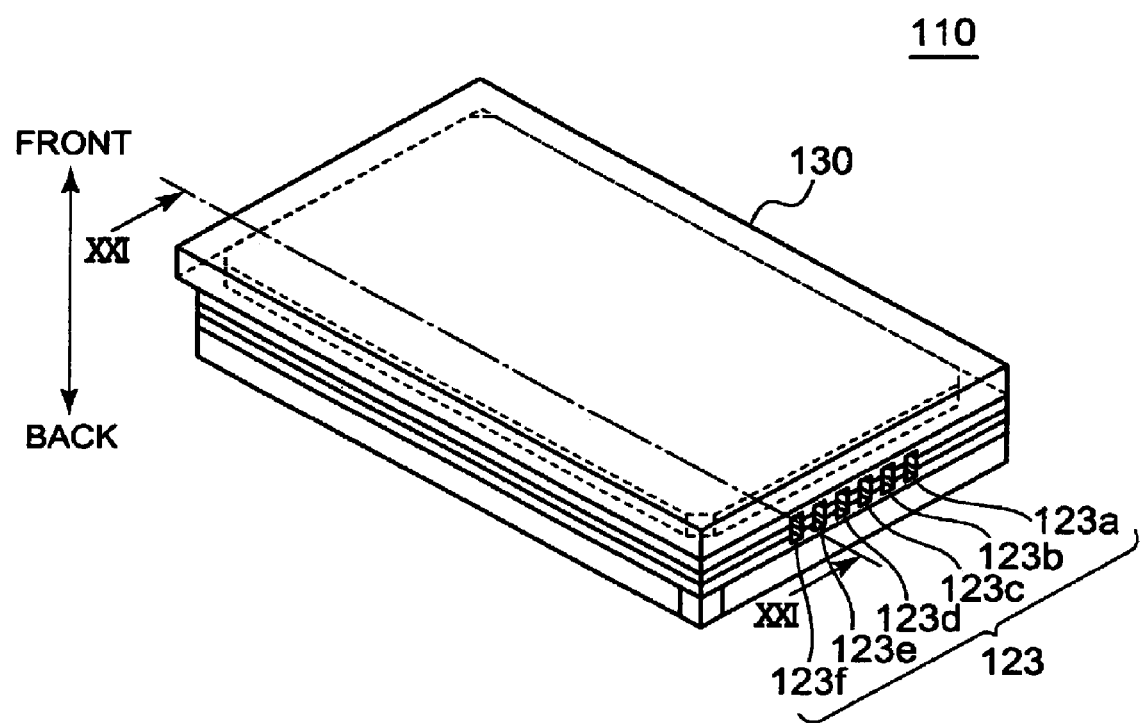
FIG. 20 is a perspective view showing a reaction device 110 according to the second embodiment of the present invention.

Next, structure of the reaction device 110 is described in more detail. FIG. 20 is a perspective view showing the reaction device 110 according to the present embodiment, FIG. 21 is a cross-sectional view of FIG. 20 corresponding to line XXI-XXI, when seen from the direction indicated by the arrow, FIG. 22 is an exploded perspective view of the reaction device 110 according to the present embodiment, and FIGS. 23 through 27 are plan views of a first substrate 300 through a fifth substrate 700.

Here, in the following description, the upper surface of FIG. 20 is referred to as front surface, and lower surface is referred to as back surface. Further, with respect to FIG. 22 and FIGS. 23 through 27 mentioned later, groove portions (flow passages) 406 and 408, groove portions (flow passages) 506 and 508, groove portions (flow passages) 606 and the like are shown in a simplified manner.

Figure 21:
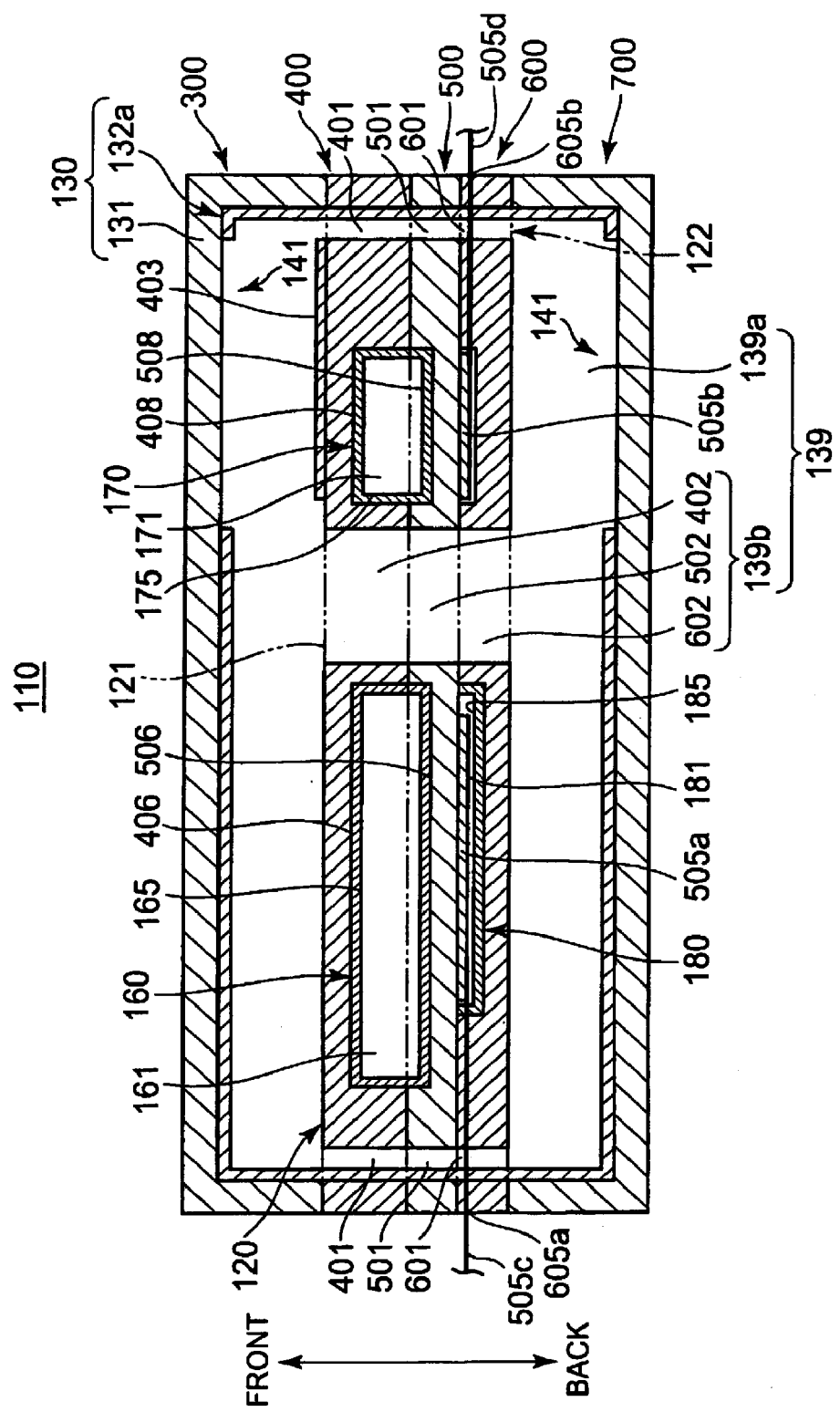
FIG. 21 is a cross-sectional view of FIG. 20 corresponding to line XXI-XXI, when seen from the direction indicated by the arrow.
Figure 22:
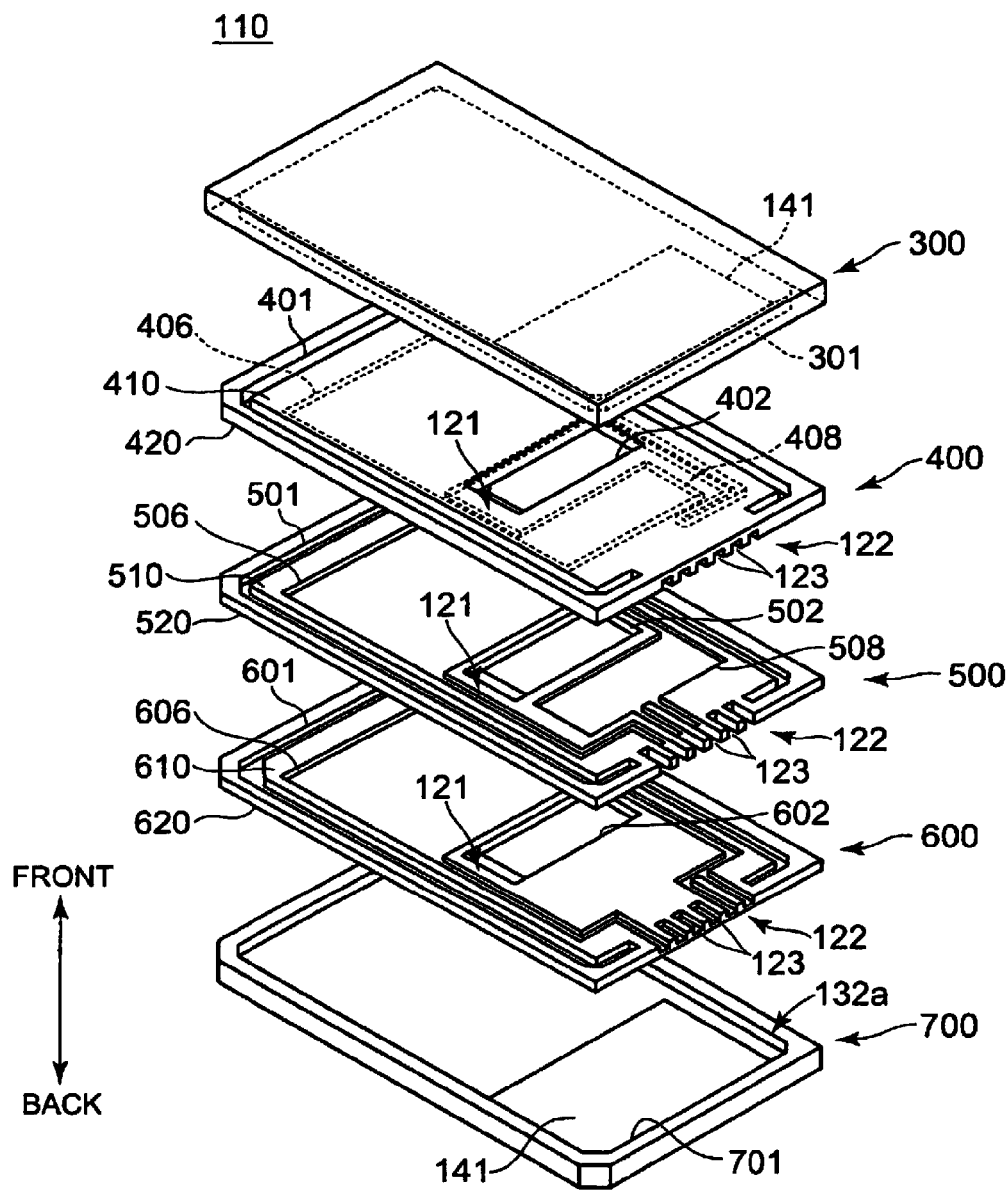
FIG. 22 is an exploded perspective view of the reaction device 110 according to the second embodiment of the present invention.

As shown in FIGS. 20 through 22, the reaction device 110 is formed as a flat plate that is structured by laminating a plurality of substrates 300, 400, 500, 600, and 700. A reaction device main body 120 is provided inside the reaction device 110.

This reaction device main body 120 is, as shown in FIG. 21, provided with a reforming reaction room 161 of the reformer 160, a carbon monoxide removing flow passage 171 of the carbon monoxide remover 170, a combustion reaction room 181 of the catalytic combustor 180, a connection portion 121 to connect the reformer 160 and the carbon monoxide remover 170, and a supporting portion 122, in its internal.

The reforming reaction room 161 is a room (flow passage) to perform the aforementioned reforming reaction, and supports reforming catalyst 165 on its internal wall surface to generate hydrogen from hydrocarbons such as methanol, and water. This reforming catalyst 165 is a catalyst of copper/zinc oxide type for example, and has copper/zinc oxide supported on alumina as the supporter.

In addition, the carbon monoxide removing flow passage 171 is a room (flow passage) to perform the aforementioned carbon monoxide removing reaction, and supports carbon monoxide removing catalyst 175 on its internal wall surface to oxidize small amount of carbon monoxide generated as by-product, other than hydrogen and the like, by the reforming catalyst 165, and thus generate carbon dioxide. This carbon monoxide removing catalyst 175 is a catalyst of platinum/alumina type for example, and has platinum, or platinum and ruthenium, supported on alumina.

The combustion room 181 is a room (flow passage) to perform the aforementioned combustion reaction, and supports combustion catalyst 185 such as platinum type catalyst on its internal wall surface to perform combustion reaction efficiently. This combustion reaction room 181 is a heating unit in the present invention, and supplies heat to the reforming reaction room 161 and the like.

The aforementioned reaction device main body 120 is arranged inside the heat-insulating container 130 by the supporting portion 122. The heat-insulating container 130 surrounds the reaction device main body 120 and transmits at least a part of heat ray (infrared ray) that is radiated from the reaction device main body 120. The reaction device main body 120 is housed in a sealed chamber 139, which is inside the heat-insulating container 130. The sealed chamber 139 is in a vacuum condition of 10 Pa or lower, preferably 1 Pa or lower.

To the internal surface of the package 131 of the heat-insulating container 130, a heat reflective film 132a is provided to prevent heat from releasing by reflecting heat ray, which is radiated from the reaction device main body 120 side, back to the reaction device main body 120 side. The heat reflective film 132a is provided so as to be opposed to the external surface of the reaction device main body 120. This heat reflective film 132a is formed by making a metal film of gold, aluminum, silver, copper, and the like, using a gas phase method such as sputter method, vacuum deposition method, and the like.

In the present embodiment, as shown in FIGS. 21 and 22, the heat reflective film 132a is partly provided with an opening portion 141. Since the internal heat of the reaction device main body 120 is released to the external through this opening portion 141, the temperature of the reaction device main body 120 is adjusted to a desired state. In the present embodiment, the opening portion 141 is provided to a region that corresponds to a part of the reaction device main body 120, that is, to front and back both sides of the region that corresponds to the carbon monoxide remover 170. Therefore, temperature of the carbon monoxide remover 170 side can be lowered with respect to the temperature of the reformer 160 side, and thus a desirable temperature difference can be provided. Here, the opening portion 141 is not limited to be provided to the front and back both sides of the region that corresponds to the carbon monoxide remover 170, and it may be provided to either one side of the front side or the back side. Here, in the aforementioned description, the opening portion 141 is formed in a form of a hole as shown in FIG. 22. However, it is not limited to such form, and it may be formed in a form in which the heat reflective film 132a is divided in midway. That is, it may be any form so long as a region without the heat reflective film 132a is provided in order to keep the temperature of the reaction device main body 120 to a desired state.

As shown in FIGS. 21 and 22, the supporting portion 122 supports the reaction device main body 120 by connecting the heat-insulating container 130 and one end portion of the reaction device main body 120, more precisely the end portion that is closer to the carbon monoxide removing flow passage 171 than the reforming reaction room 161. Thus, the heat-insulating container 130 and the reaction device main body 120 are made integral.

To this supporting portion 122, supply and discharge portion 123 (refer to FIG. 20 and FIGS. 24 through 26 described later) is provided to supply reaction material used for the reforming reaction, the carbon monoxide removing reaction, and the combustion reaction that are performed at the reaction device main body 120, from the external to the reaction device main body 120. The supply and discharge portion 123 also discharges the product material generated by these reactions to the external.

As shown in FIG. 20, the supply and discharge portion 123 includes a fuel supplying port 123a, a fuel oxygen supplying port 123b, an oxygen auxiliary supplying port 123c, a product discharging port 123d, a reactant supplying port 123e, and a fuel discharging port 123f, that open at the external surface of the heat-insulating container 130.

The fuel supplying port 123a lets off-gas that includes hydrogen used for combustion at the catalytic combustor 180, methanol as a fuel for combustion, and the like flow inside. The fuel oxygen supplying port 123b lets oxygen used for combustion at the catalytic combustor 180, flow inside. Here, to each of the fuel supplying port 123a and the fuel oxygen supplying port 123b, a pump device (not shown) to feed the fuel and the like with pressure are connected.

The oxygen auxiliary supplying port 123c lets oxygen to selectively oxidize carbon monoxide at the carbon monoxide remover 170 flow inside.

The product discharging port 123d discharges the gaseous mixture that mainly contains hydrogen, which is generated by the aforementioned reforming reaction and the carbon monoxide removing reaction, and is connected to the anode of the fuel cell 103. The reactant supplying port 123e lets hydrocarbons such as methanol and the like, and water, which are to be reformed into hydrogen at the reformer 160, flow inside, and is connected from the vaporizer 150.

The fuel discharging port 123f discharges carbon dioxide and water generated by the combustion at the catalytic combustor 180.

As shown in FIG. 22, the aforementioned reaction device 110 is formed by laminating and attaching the first substrate 300, the second substrate 400, the third substrate 500, the fourth substrate 600, and the fifth substrate 700 in this order. That is, the back surface of the first substrate 300 and the front surface of the second substrate 400 are attached, the back surface of the second substrate 400 and the front surface of the third substrate 500 are attached, the back surface of the third substrate 500 and the front surface of the fourth substrate 600 are attached, and the back surface of the fourth substrate 600 and the front surface of the fifth substrate 700 are attached.

Here, in the present embodiment, the first substrate 300 through the fifth substrate 700 are glass substrates. More precisely, they are glass substrates that contain Na, Li, and the like that can serve as movable ions, and each substrate is attached with each other by anodic bonding and the like for example. As for such glass substrate, it is preferable to use Pyrex (registered trademark) for example.

The first substrate 300 through the fifth substrate 700 have a substantially rectangular shape when observed in plan view, and dimension along the outer border is approximately the same. Further, at least part of side surface of the substrates are mount flush with each other.

Next, description on each substrate 300, 400, 500, 60, and 700 will be given.

[First Substrate]

Figure 23:
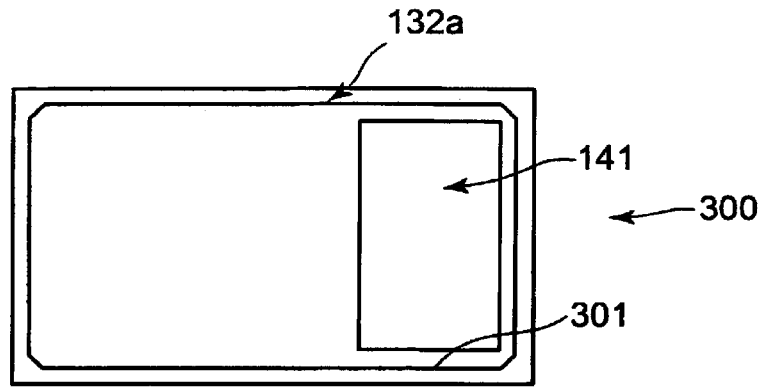
FIG. 23 is a plan view of a first substrate 300.

As shown in FIG. 23, to the back surface side of the first substrate 300, that is, to the side that is opposed to the front surface of the second substrate 400, a rectangular shaped concave portion 301 is formed. To the internal surface of the concave portion 301, the aforementioned heat reflective film 132a is provided, and an opening portion 141 is provided to the heat reflective film 132a. The first substrate 300 thus forms upper side portion of the package 131, with respect to the heat-insulating container 130.

[Second Substrate]

Figure 24:
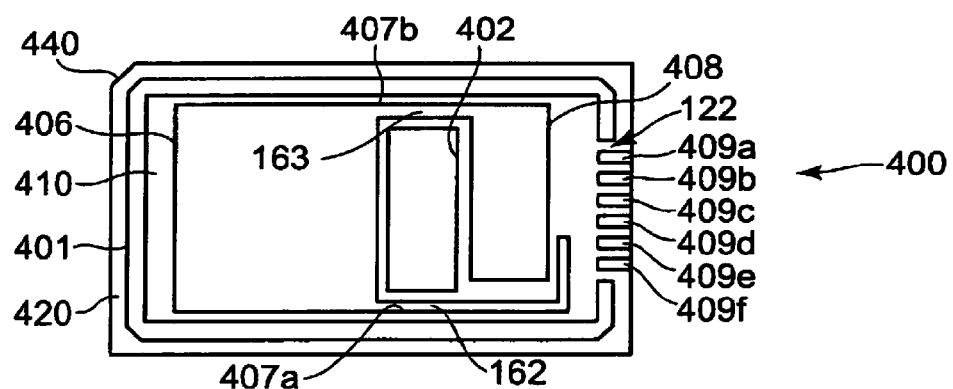
FIG. 24 is a plan view of a second substrate 400.

As shown in FIG. 24, the second substrate 400 has a triangular shaped cutout portion 440 at the corner portion of one end portion (end portion of left side in figure). To the second substrate 400, a hole 401 that penetrates through the front and back surface is provided. The hole 401 is formed in a substantially C-shape, along the periphery of the second substrate 400. That is, the hole 401 is provided along the periphery of the second substrate 400, except for the region where it is the supporting portion 122 of the second substrate 400. The internal portion surrounded by the hole 401 serves as the main body 410 which becomes the reaction device main body 120, and the portion divided to the external side of the main body 410 by the hole 401 serves as the frame unit 420 which becomes the package 131.

To the internal periphery surface of the hole 401, the aforementioned heat reflective film 132a is provided.

To the central portion of the main body 410, a rectangular hole 402 is formed. To the internal periphery surface of the hole 402, a radiation preventing film (not shown) that has heat-insulating property may be provided. Here, the radiation preventing film is formed by metal such as aluminum and the like, for example.

As shown in FIG. 21, to the front surface of the second substrate 400, that is, to the surface that is opposed to the concave portion 301 of the first substrate 300, and where it also corresponds to the carbon monoxide remover 170 for example, a getter 403 may be provided. The getter 403 is activated by being heated, and adsorbs gas and fine particles in its surroundings. Thus, the getter 403 adsorbs gas that exists in the sealed chamber 139 of the reaction device 110, and improves or maintains degree of vacuum of the sealed chamber 139. As for material used for the getter 403, metal alloy that includes zirconium, barium, titanium, or vanadium as main component, can be mentioned. Here, an electric heater such as electric heating material and the like to heat and activate the getter 403 may be provided to the getter 403, and electric cable of the electric heater may be pulled out to the external of the heat-insulating container 130. Further, it is preferable to provide the getter 403 at a location where the temperature of the getter 403 does not exceed the activation temperature during performance of the reaction device 110.

To the back surface of the second substrate 400, that is, to the attaching surface with the third substrate 500, groove portion 406, groove portion 407a and 407b, groove portion 408, and groove portions 409a through 409f are formed. The groove portion 406 is provided in a region, with respect to the main body 410, that is opposed to the supporting portion 122 with respect to the hole 402. The groove portion 406 is formed in a zigzag manner for example. To the internal wall surface of the groove portion 406, the aforementioned reforming catalyst 165 (refer to FIG. 21) is supported.

The groove portion 407a is provided in a region from the end portion of the groove 406, to the supporting portion 122 side with respect to the hole 402, within the main body 410. The groove portion 407b is provided from the end portion of the groove portion 406 to the groove portion 408.

The groove portion 408 is provided in a region, with respect to the main body 410, that is in the same side with the supporting portion 122 with respect to the hole 402 (the other end side, which is on the opposite side of the one end portion side). The groove portion 408 is formed in a zigzag manner for example. To the internal wall surface of the groove portion 408, the aforementioned carbon monoxide removing catalyst 175 (refer to FIG. 21) is supported.

The groove portions 409a through 409f are provided in order at the same side with the supporting portion 122 (the other end portion, which is on the opposite side of the one end portion,) of the second substrate 400. One end portion of the groove portions 409a through 409f are opened to the side surface of the other end portion side of the second substrate 400, and the other end portions are blocked.

[Third Substrate]

Figure 25:
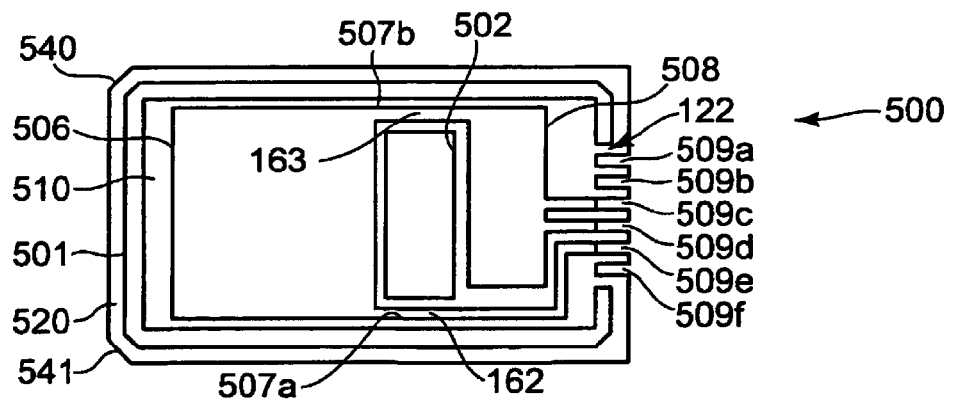
FIG. 25 is a plan view of a third substrate 500.

As shown in FIG. 25, the third substrate 500 has cutout portions 540 and 541, and cutout portions 509a through 509f. The cutout portions 540 and 541 are provided in a triangle shape in the two corner portions of one end portion of the third substrate 500 (end portion of left side in figure).

The cutout portions 509a through 509f are provided in order at end portion of the supporting portion 122 side of the third substrate 500, in a state that they correspond to the groove portions 409a through 409f of the second substrate 400. When the second substrate 400 is layered with the third substrate 500, the cutout portions 509a through 509f are opposed to the groove portions 409a through 409f respectively. Among these, cutout portions 509a, 509b, and 509f are provided so that one end portions of them are opened to the side surface of the other end portion side of the third substrate 500, and the other end portions of them are blocked. Further, the cutout portions 509c and 509d are provided so that one end portions of them are opened to the side surface of the other end portion side of the third substrate 500, and the other end portions of them are communicated with the groove 508 described later. The cutout portion 509e is provided so that one end portion of it is opened to the side surface of the other end portion side of the third substrate 500, and the other end portion of it is communicated with the groove 507a described later.

To the third substrate 500, a hole 501 that penetrates through the front and back surface is provided.

The hole 501 is formed in a substantially C-shape, along the periphery of the third substrate 500. That is, the hole 501 is provided along the periphery of the third substrate 500, except for the region where it is the supporting portion 122 of the third substrate 500. The internal portion surrounded by the hole 501 serves as the main body 510 which becomes the reaction device main body 120, and the portion divided to the external side of the main body 510 by the hole 501 serves as the frame unit 520 which becomes the package 131.

To the internal periphery surface of the hole 501, the aforementioned heat reflective film 132a is provided.

To the central portion of the main body 510, a rectangular hole 502 is formed. These holes 501 and 502 correspond to the holes 401 and 402 of the second substrate 400 respectively, and when the second substrate 400 and the third substrate 500 are layered, they are connected with the holes 401 and 402 respectively. To the internal periphery surface of the hole 502, a radiation preventing film (not shown) that has heat-insulating property may be provided. Here, the radiation preventing film is formed by metal such as aluminum and the like, for example.

As shown in FIG. 21, to the back surface of the third substrate 500, that is, to the attaching surface with the fourth substrate 600, thin film heaters 505a and 505b as the heating unit of the present invention are provided in a zigzag manner for example. These thin film heaters 505a and 505b are made of electrical heating material such as heat-generating resister or heat-generating semiconductor that generates heat by being applied with voltage, and supplies heat to the reforming reaction room 161 and to the carbon monoxide removing flow passage 171 respectively, at the time of start up, and set them to a predetermined temperature. To each of the thin film heaters 505a and 505b, electric cables 505c and 505d that conduct electricity between the internal side and the external side of the reaction device 110 are connected respectively. Here, as shown in FIG. 21, the thin film heaters 505a and 505b may be provided only to the back surface of the third substrate 500, or may be provided to both front and back surface. In a case where it is also provided to the front surface, it is desirable to cover it with a suitable protective film. Further, since it is preferable that the electric cable 505c and 505d are thin, Kovar cable was used as the electric cables 505c and 505d in the present embodiment, and the diameter of the cable was set to 0.2 mm. However, as for the electric cables 505c and 505d, steel-nickel metal alloy cable, DUMET cable that has core material of steel-nickel metal alloy coated with copper layer may also be used.

As shown in FIG. 25, to the front surface of the third substrate 500, that is, to the attaching surface with the second substrate 400, groove portion 506, groove portions 507a and 507b, and groove portion 508 are formed. The groove portion 506 is provided in a region, with respect to the main body 510, that is opposed to the supporting portion 122 with respect to the hole 502. The groove portion 506 is formed in a zigzag manner for example. To the internal wall surface of the groove portion 506, the aforementioned reforming catalyst 165 (refer to FIG. 21) is supported. The groove portion 506 corresponds to the groove portion 406 of the second substrate 400, and is opposed to the groove portion 406 when the second substrate 400 and the third substrate 500 are layered.

The groove portion 507a is provided from the end portion of the groove portion 506 to the cutout portion 509e. The groove portion 507b is provided from the end portion of the groove portion 506 to the groove portion 508. These groove portions 507a and 507b correspond to the groove portions 407a and 407b of the second substrate 400, and are opposed to the groove portions 407a and 407b respectively when the second substrate 400 and the third substrate 500 are layered.

The groove portion 508 is provided in a region, with respect to the main body 510, that is in the same side with the supporting portion 122 with respect to the hole 502. The groove portion 508 is formed in a zigzag manner for example. To the internal wall surface of the groove portion 508, the aforementioned carbon monoxide removing catalyst 175 (refer to FIG. 21) is supported. The groove portion 508 corresponds to the groove portion 408 of the second substrate 400, and is opposed to the groove portion 408 when the second substrate 400 and the third substrate 500 are layered.

[Fourth Substrate]

Figure 26:
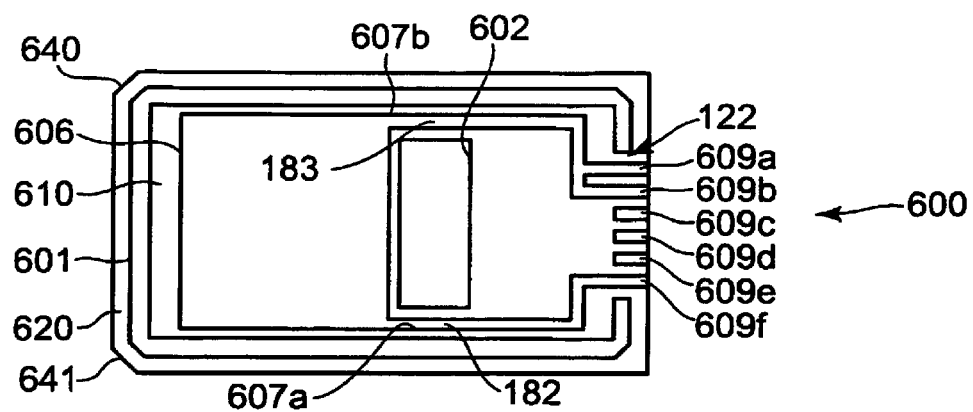
FIG. 26 is a plan view of a fourth substrate 600.

As shown in FIG. 26, the fourth substrate 600 has a triangle shaped cutout portions 640 and 641 at each corner portions of one end portion (end portion of left side in figure). To the fourth substrate 600, a hole 601 that penetrates through the front and back surface is provided.

The hole 601 is formed in a substantially C-shape, along the periphery of the fourth substrate 600. That is, the hole 601 is provided along the periphery of the fourth substrate 600, except for the region where it is the supporting portion 122 of the fourth substrate 600.

The internal portion surrounded by the hole 601 serves as the main body 610 which becomes the reaction device main body 120, and the portion divided to the external side of the main body 610 by the hole 601 serves as the frame unit 620 which becomes the package 131.

To the internal periphery surface of the hole 601, the aforementioned heat reflective film 132a is provided.

To the central portion of the main body 610, a rectangular hole 602 is formed.

Each of these holes 601 and 602 corresponds to the hole 501 and hole 502 of the third substrate 500 respectively, and when the third substrate 500 and the fourth substrate 600 are layered, they are connected with the hole 501 and hole 502 respectively. To the internal periphery surface of the hole 602, a radiation preventing film (not shown) that has heat-insulating property may be provided. Here, the radiation preventing film is formed by metal such as aluminum and the like, for example.

To the front surface of the fourth substrate 600, that is, to the attaching surface with the third substrate 500, a groove portion 606, groove portions 607a and 607b, groove portions 609a through 609f, and conducting grooves 605a and 605b (refer to FIG. 21) are formed.

The groove portion 606 is provided in a region, with respect to the main body 610, that is opposed to the supporting portion 122 with respect to the hole 602. The groove portion 606 is formed in a zigzag manner for example. To the internal wall surface of the groove portion 606, the aforementioned reforming catalyst 165 (refer to FIG. 21) is supported.

The groove portions 607a and 607b are each provided from the end portion of the groove portion 606 to the region, which is in the supporting portion 122 side with respect to the hole 602, within the main body 610.

The groove portions 609a through 609f are provided in order at the end portion of the supporting portion 122 side of the fourth substrate 600, in a state that they correspond to the cutout portions 509a through 509f of the third substrate 500. The groove portions 609a through 609f are opposed to the cutout portions 509a through 509f respectively when the third substrate 500 and the fourth substrate 600 are layered. Among these, the groove portions 609a and 609b are provided so that one end portion of them are opened to the side surface of the other end portion side of the fourth substrate 600, and the other end portions of them join so as to be connected with the groove portion 607b. Further, the groove portions 609c through 609e are provided so that one end portion of them are opened to the side surface of the other end portion side of the fourth substrate 600, and the other end portions of them are blocked. The groove portion 609f is provided so that one end portion of it is opened to the side surface of the other end portion side of the fourth substrate 600, and the other end portion of it is communicated with the groove 607a.

As shown in FIG. 21, the conducting grooves 605a and 605b are provided on a surface of the fourth substrate 600 that is opposed to the third substrate 500, and are located so as to correspond with the electric cables 505c and 505d respectively. The conducting groove 605a lets the electric cable 505c go through, that is connected to the thin film heater 505a, and the conducting groove 605b lets the electric cable 505d go through, that is connected to the thin film heater 505b.

[Fifth Substrate]

Figure 27:
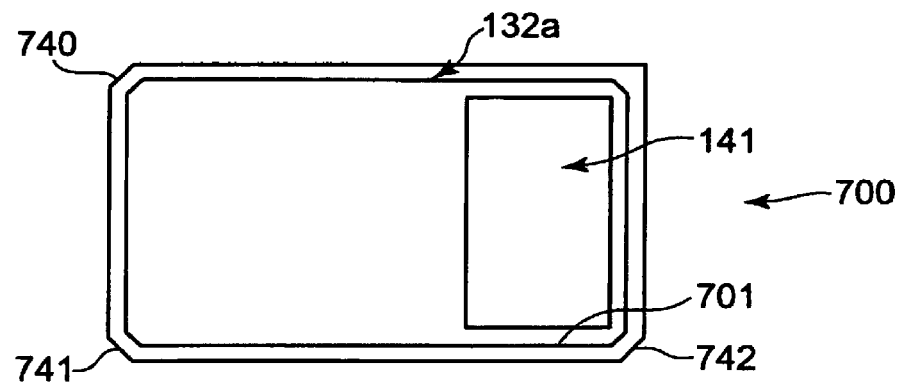
FIG. 27 is a plan view of a fifth substrate 700.

As shown in FIG. 27, the fifth substrate 700 is formed in a substantially symmetry manner with respect to the first substrate 300 in up and down direction, and has triangle shaped cutout portions 740 through 742 at each corner portion of the end portion (end portion of left side in figure) and at a corner portion of the other end portion. To the front surface side of the fifth substrate 700, that is, to the surface that is opposed to the back surface of the fourth substrate 600, a rectangular concave portion 701 is formed. To the internal surface of the concave portion 701, a heat reflective film 132a that is the same with the one provided to the internal surface of the concave portion 301 of the first substrate 300 is provided, and an opening portion 141 is provided to the heat reflective film 132a.

The fifth substrate 700 forms the lower side portion of the package 131 of the heat-insulating container 130.

By laminating and attaching the aforementioned first substrate 300, the second substrate 400, the third substrate 500, the fourth substrate 600, and the fifth substrate 700, the reaction device 110 is formed. Thus, the sealed chamber 139 is formed, and the heat-insulating container 130 is formed at the outside of the sealed chamber 139, by the concave portion 301, the holes 401, 402, 501, 502, 601, 602, and the concave portion 701. Here, for descriptive purpose, a room formed by the concave portion 301, the holes 401, 501, 601, and the concave portion 701 is referred to as heat-insulating room 139a, and a room formed by the holes 402, 502, and 602 is referred to as heat-insulating room 139b (refer to FIG. 21).

Further, reforming reaction room 161 is formed by the groove portions 406 and 506, flow passage 162 is formed by the groove portions 407a and 507a, communication flow-passage 163 is formed by the groove portions 407b and 507b, and carbon monoxide removing flow passage 171 is formed by the groove portion 408 and the groove portion 508.

Further, the combustion reaction room 181 and flow passages 182, 183 are formed by placing the third substrate 500 as a lid on the groove portion 606 and the groove portions 607a and 607b.

In addition, the fuel supplying port 123a, the fuel oxygen supplying port 123b, the oxygen auxiliary supplying port 123c, the product discharging port 123d, the reactant supplying port 123e, and the fuel discharging port 123f of the supply and discharge portion 123 are formed by the groove portions 409a through 409f, the cutout portions 509a through 509f, and the groove portions 609a through 609f.

Accordingly, the reactant supplying port 123e is connected with the reforming reaction room 161 by the flow passage 162, the reforming reaction room 161 is connected with the carbon monoxide removing flow passage 171 by the communication flow-passage 163, the carbon monoxide removing flow passage 171 is connected with the oxygen auxiliary supplying port 123c and the product discharging port 123d, the fuel supplying port 123a and the fuel oxygen supplying 123b are connected with the combustion reaction room 181 by the flow passage 183, and the combustion reaction room 181 is connected with the fuel discharging port 123f by the flow passage 182.

[Performance of the Fuel Cell Device]

Next, description on the performance of the fuel cell device 101 will be given.

First of all, fuel (liquid fuel of hydrocarbons such as methanol and the like, for example) and water are supplied from the fuel container 102 to the vaporizer 150, and are vaporized at the vaporizer 150.

Next, when the gaseous mixture of fuel and water vapor that are vaporized at the vaporizer 150 flows into the reforming reaction room 161 through the reactant supplying port 123e of the supply and discharge portion 123 and the flow passage 162, hydrogen and the like are generated by the reforming catalyst 165.

Here, heat that is generated at the thin film heater 505, reaction heat (combustion heat) generated at the combustion reaction room 181, and the like are supplied to the reforming reaction room 161. Further, heat ray that is radiated from the internal side to the external side of the reaction device main body 120 is reflected toward the internal by the heat reflective film 132a of the first substrate 300 and the fifth substrate 700. As a result, temperature of the reforming reaction room 161 becomes relatively high, and the reforming catalyst 165 is heated to temperatures in the range of 200 to 400 degrees Celsius, to the temperature approximately 300 degrees Celsius in the present embodiment.

Here, the reforming reaction at the reforming reaction room 161 is conducted by steam reforming method in the present embodiment. However, it may also be conducted by partial oxidation reforming method.

Subsequently, the generated hydrogen and the like pass through the communication flow-passage 163, enter the carbon monoxide removing flow passage 171, and are mixed with air that flows in from the oxygen auxiliary supplying port 123c of the supply and discharge portion 123. Accordingly, carbon monoxide contained in the gaseous mixture is oxidized and removed by the carbon monoxide removing catalyst 175.

Here, the reformer 160 and the catalytic combustor 180 are physically connected with the carbon monoxide remover 170 through the flow passage portion of the connection portion 121. However, a heat-insulating room 139b is provided in between the reformer 160 and the catalytic combustor 180, and the carbon monoxide remover 170. Therefore, cross-sectional area of the connection portion 121 in between them is decreased, and heat propagation from the reformer 160 and the catalytic combustor 180 to the carbon monoxide remover 170 is suppressed.

On the other hand, internal heat of the reaction device main body 120 is released to the external through the opening portion 141 of the heat reflective film 132a that is provided to the first substrate 300 and the fifth substrate 700. Therefore, temperature of the carbon monoxide remover 170 decreases. As a result, a suitable temperature difference can be provided in between the reformer 160 and the carbon monoxide remover 170.

Accordingly, the carbon monoxide remover 170 is set to a relatively low temperature compared to the reformer 160, and the carbon monoxide removing catalyst 175 is set to temperature ranging from 120 to 200 degrees Celsius, approximately 120 degrees Celsius in the present embodiment.

Next, when air is supplied to the cathode of the fuel cell 103, and gaseous mixture of hydrogen and the like in the carbon monoxide removing flow passage 171 are supplied to anode of the fuel cell 103 through the product discharging port 123d of the supply and discharge portion 123, electric energy is generated at the fuel cell 103.

Subsequently, gaseous mixture that include un-reacted hydrogen at the anode of the fuel cell 103 (off-gas) flows into the combustion reaction room 181 through the fuel supplying port 123a of the supply and discharge portion 123 and through the flow passage 183, and air flows from the external into the combustion reaction room 181 through the fuel oxygen supplying port 123b of the supply and discharge portion 123 and through the flow passage 183. Accordingly, hydrogen is combusted at the combustion reaction room 181 to generate combustion heat, and product material such as water and carbon dioxide are discharged to the external from the fuel discharging port 123f of the supply and discharge portion 123, through the flow passage 182.

According to the aforementioned reaction device 110 of the fuel cell device 101, the reformer 160 and the carbon monoxide remover 170 are provided with the intermediary of the communication flow-passage 163 in between the second substrate 400 and the third substrate 500. Therefore, in contrast to the conventional case where the reformer 160 and the carbon monoxide remover 170 are provided independently and are connected with a connection pipe and the like, the device as a whole can be minimized.

Further, internal heat of the reaction device main body 120 can be kept inside by the heat reflective film 132a, and can be simultaneously released to the external through the opening portion 141 in the region that corresponds to the carbon monoxide remover 170. Therefore, temperature of the carbon monoxide remover 170 can be lowered and a suitable temperature distribution can be formed in the reaction device main body 120. As a result, even in a case where the reaction device main body 120 is minimized, and the reformer 160 and the carbon monoxide remover 170 are arranged at a relatively close range, the reformer 160 and the carbon monoxide remover 170 can be each set to an optimum temperature, and reaction can be conducted suitably at each of the reformer 160 and the carbon monoxide remover 170.

Further, the reformer 160 and the carbon monoxide remover 170 are provided in a connected manner in the reaction device main body 120 by laminating the first substrate 300 through the fifth substrate 700. Therefore, in contrast to a conventional case where the reformer 160 and the carbon monoxide remover 170 are manufactured separately and are connected with a connection pipe, the reaction device main body 120 can be manufactured at one time. In addition, the reaction device main body 120 and the heat-insulating container 130 are formed in an integrated manner. Therefore, in contrast to a case where the reaction device main body 120 and the heat-insulating container 130 are manufactured separately and then the reaction device main body 120 is arranged inside the heat-insulating container 130, the reaction device 110 is manufactured at one time Accordingly, manufacturing step of the reaction device 110 can be reduced.

Further, in a case where a pipe that is connected to the reaction device main body 120 is inserted into the heat-insulating container 130, there is a possibility that that gas leaks from the gap between the heat-insulating container 130 and the pipe. In contrast, according to the reaction device 110, since the supply and discharge portion 123 and the heat-insulating container 130 are provided in an integrated manner, the sealed space of the heat-insulating container 130 can be kept at a high sealed state. Thus, burden to keep the sealed state of the sealed space can be simplified.

In addition, although the reaction device main body 120 is heat-insulated at vacuum pressure with the intermediary of the sealed space of the sealed chamber 139 by the heat-insulating container 130, since the supporting portion 122 that is provided with the supply and discharge portion 123 is connected to one end portion on the carbon monoxide remover 170 side of the reaction device main body 120, the internal heat of the reformer 160 and the carbon monoxide remover 170 propagate from the one end portion to the heat-insulating container 130. However, since the portion where heat propagates from the reformer 160 and the carbon monoxide remover 170 to the heat-insulating container 130 are located together, and since the carbon monoxide remover flow passage 171 is kept to a relatively low temperature with respect to the reformer 160 as mentioned above, temperature difference with the heat-insulating container 130 is relatively small compared to the case where the reformer 160 side is connected to the heat-insulating container 130. Therefore, amount of heat that propagates to the heat-insulating container 130 through the supporting portion 122 can be kept relatively small. Further, concerning the supporting portion 122, since the temperature difference between the carbon monoxide remover 170 at the one end portion side of the supporting portion 122 and the heat-insulating container 130 at the other end portion side is relatively small, thermal stress that is applied to the supporting portion 122 can be kept relatively small, and thus damage of the supporting portion 122 due to thermal stress can be suppressed.

In addition, since the heat-insulating room 139b is provided in between the reformer 160 and the carbon monoxide remover 170, cross-sectional area of a portion of the flow passage that connects the reformer 160 and the carbon monoxide remover 170 can be suppressed. Therefore, amount of heat that propagates from the reformer 160 and the catalytic combustor 180 to the carbon monoxide remover 170 can be suppressed, and heat is released to the external through the opening 141 that is provided to the heat reflective film 132a on the first substrate 300 and the fifth substrate 700. As a result, a suitable temperature difference can be provided in between the reformer 160 and the carbon monoxide remover 170, and thus even in a case where the reaction device main body 120 is minimized and the reformer 160 and the carbon monoxide remover 170 are arranged in a relatively close manner, the carbon monoxide remover 170 can be set to a relatively low temperature.

Further, since the first substrate 300 through the fifth substrate 700 are made of glass and the materials are all the same, when performing/terminating the reaction device 110, that is, during temperature increase/decrease of each substrate, thermal stress due to the difference in amount of thermal expansion can be suppressed. Therefore, damage of the reaction device 110 due to the thermal stress can be suppressed.

In addition, the getter 403 is located in a region where it corresponds to the carbon monoxide remover 170, in the internal surface of the sealed chamber 139. Therefore, in contrast to the case where the getter 403 is located in a region where it corresponds to the reformer 160 or the catalytic combustor 180, activation of the getter 403 during performance of the reaction device 110 can be prevented.

Figure 28:
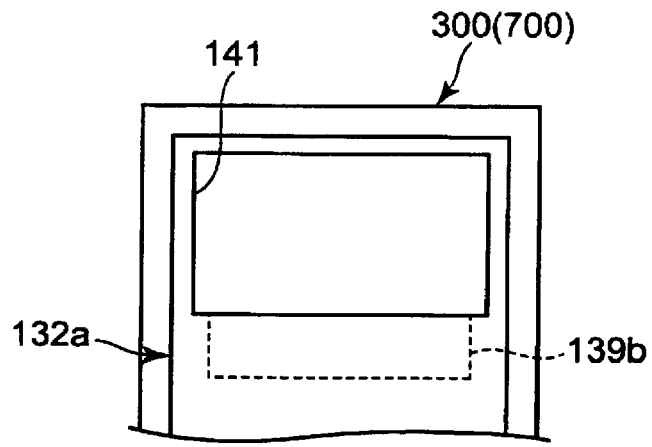
FIG. 28 is a view showing a shape of an opening of a heat reflective film.
Figure 29:
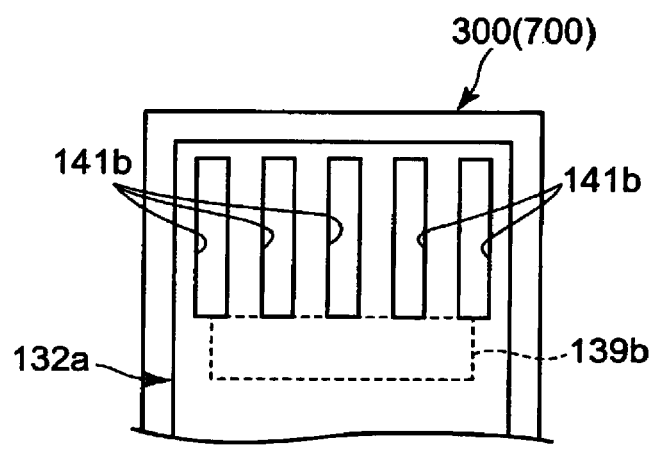
FIG. 29 is a view showing another example of a shape of an opening of a heat reflective film.
Figure 30:
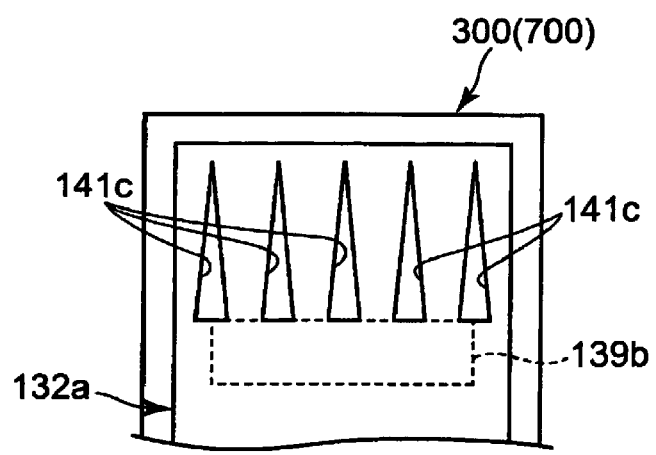
FIG. 30 is a view showing another example of a shape of an opening of a heat reflective film.
Figure 31:
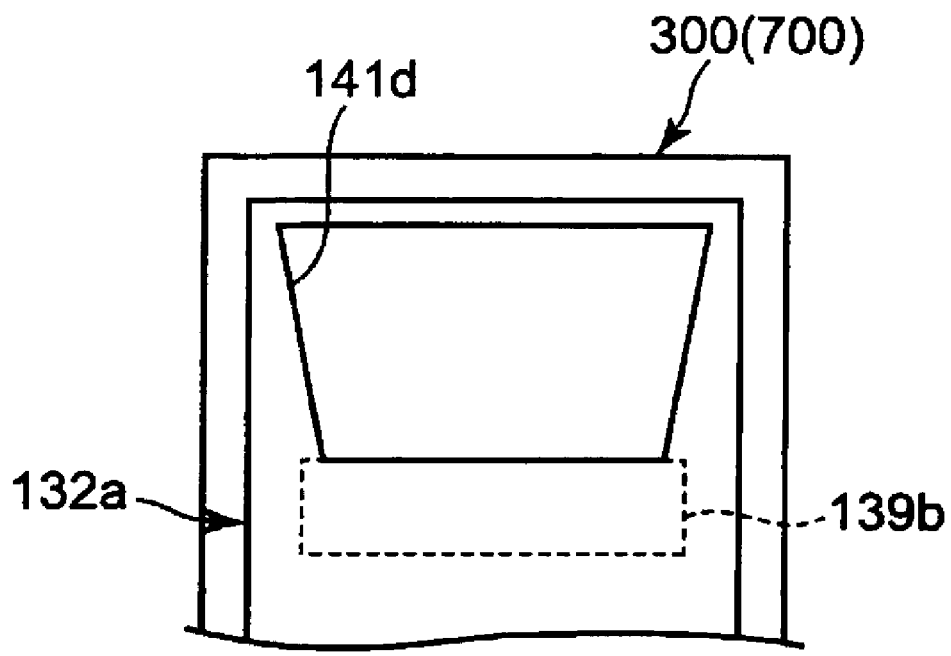
FIG. 31 is a view showing another example of a shape of an opening of a heat reflective film.
Figure 32:
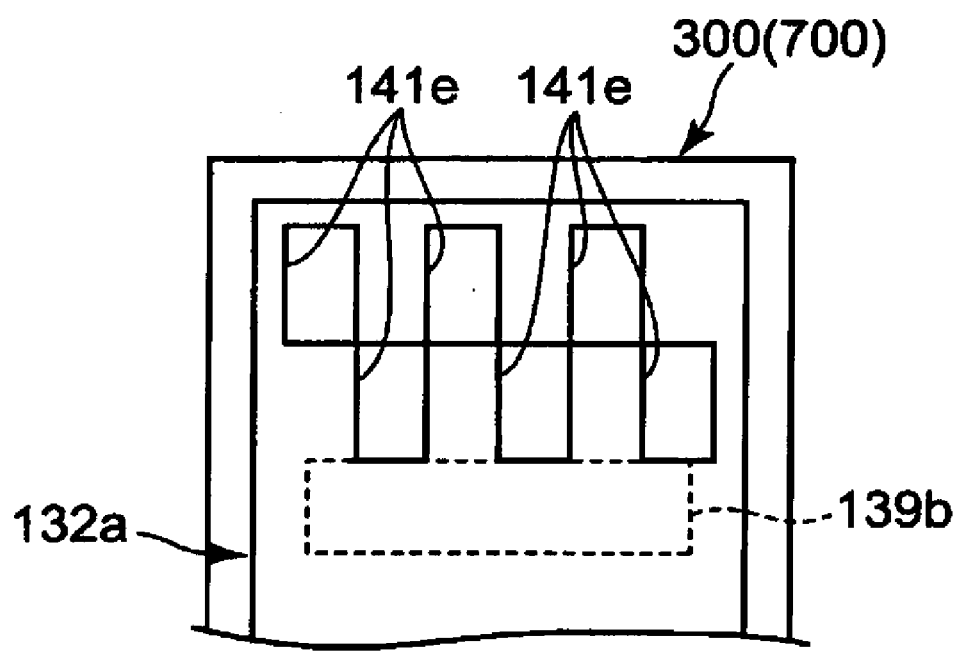
FIG. 32 is a view showing another example of a shape of an opening of a heat reflective film.

Here, in the aforementioned embodiment, a case where the opening portion 141 of the heat reflective film 132a is provided singly in a rectangular shape was described. However, shape and number of the opening portion 141 is not limited to this embodiment. FIG. 28 through FIG. 32 are figures that show examples of shape of the opening portion of the heat reflective film. Here, FIG. 28 shows a case of the aforementioned rectangular shape, for comparison. In this case, ratio of the area of the opening portion 141 to the projected area of the carbon monoxide remover 170 (hereinafter referred to as opening ratio [%]) is 100%. The opening portion 141 may be formed with shape and number as shown in FIG. 29 through FIG. 32 for example. As shown in the aforementioned FIG. 3, amount of heat that is released by radiation (heat loss by emission of radiation) from the opening portion 141 is proportional to the area of the opening portion 141. Therefore, the opening ratio of the opening portion 141 is set in accordance with the preset temperature of the carbon monoxide remover 170. In a case where the opening ratio is set to approximately 50%, as shown by the opening portions 141b and 141e of FIG. 29 and FIG. 32, the opening portion 141 may be provided in plural with a rectangular shape. In addition, as shown by the opening portion 141c of FIG. 30, the opening portion 141 may be provided in a triangle shape, so that the opening area becomes larger as it becomes closer to the reforming reaction room 161 side, where the temperature becomes higher than that of the carbon monoxide remover 170, in order to make the temperature of the carbon monoxide remover 170 more uniform compared to the opening portion 141 shown in FIG. 28. Further, as shown by the opening portion 141d of FIG. 31, the opening portion 141 may be provided in a trapezoid shape, so that the width of opening portion side at the connecting portion of the reforming reaction room 161 and the carbon monoxide remover 170 becomes small. Accordingly, temperature change at the connecting portion of the reforming reaction room 161 and the carbon monoxide remover 170 can be made gradual compared to the opening portion 141 shown in FIG. 28, and thus generation of stress due to sharp temperature distribution can be prevented.

Further, a case where one reforming reaction room 161 and one carbon monoxide removing flow passage 171 are each provided to the reaction device main body 120 was described. However, the reforming reaction room 161 and the carbon monoxide removing flow passage 171 may be provided in plural, by manufacturing the reaction device main body 120 in a laminated manner, in which the second substrate 400 through the fourth substrate 600 are laminated in plural in this order in between the first substrate 300 and the fifth substrate 700.

A case where all of the fist substrate 300 through the fifth substrate 700 are made of glass was described. However, they may also be made of ceramic. Here, concerning prevention of thermal stress during temperature change due to the difference in thermal expansion coefficient, it is preferable that the first substrate 300 through the fifth substrate 700 are formed by a same material.

A case where the supporting portion 122 to support the reaction device main body 120 is provided to the reaction device 110 only at the carbon monoxide remover 170 side, and the supply and discharge portion 123 is provided to the supporting portion 122 was described. However, the present invention is not limited to such embodiment.

Figure 33:
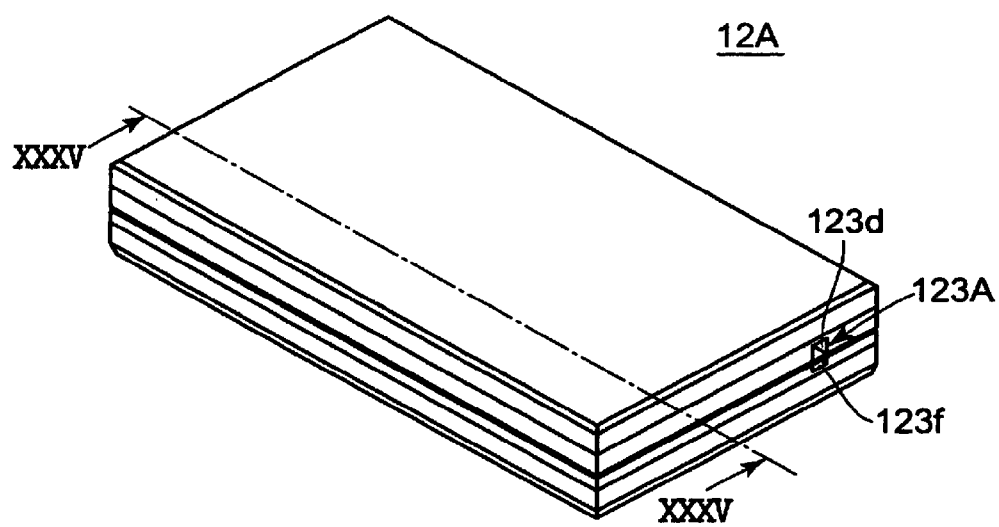
FIG. 33 is a perspective view showing an example of another structure of a reaction device according to the second embodiment.
Figure 34:
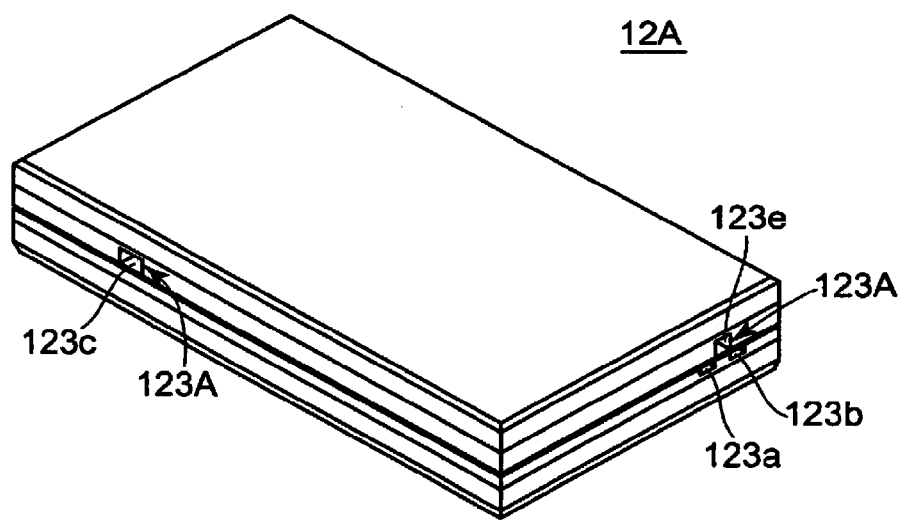
FIG. 34 is a perspective view showing an example of another structure of a reaction device according to the second embodiment when observed from opposite direction with respect to FIG. 33.
Figure 35:
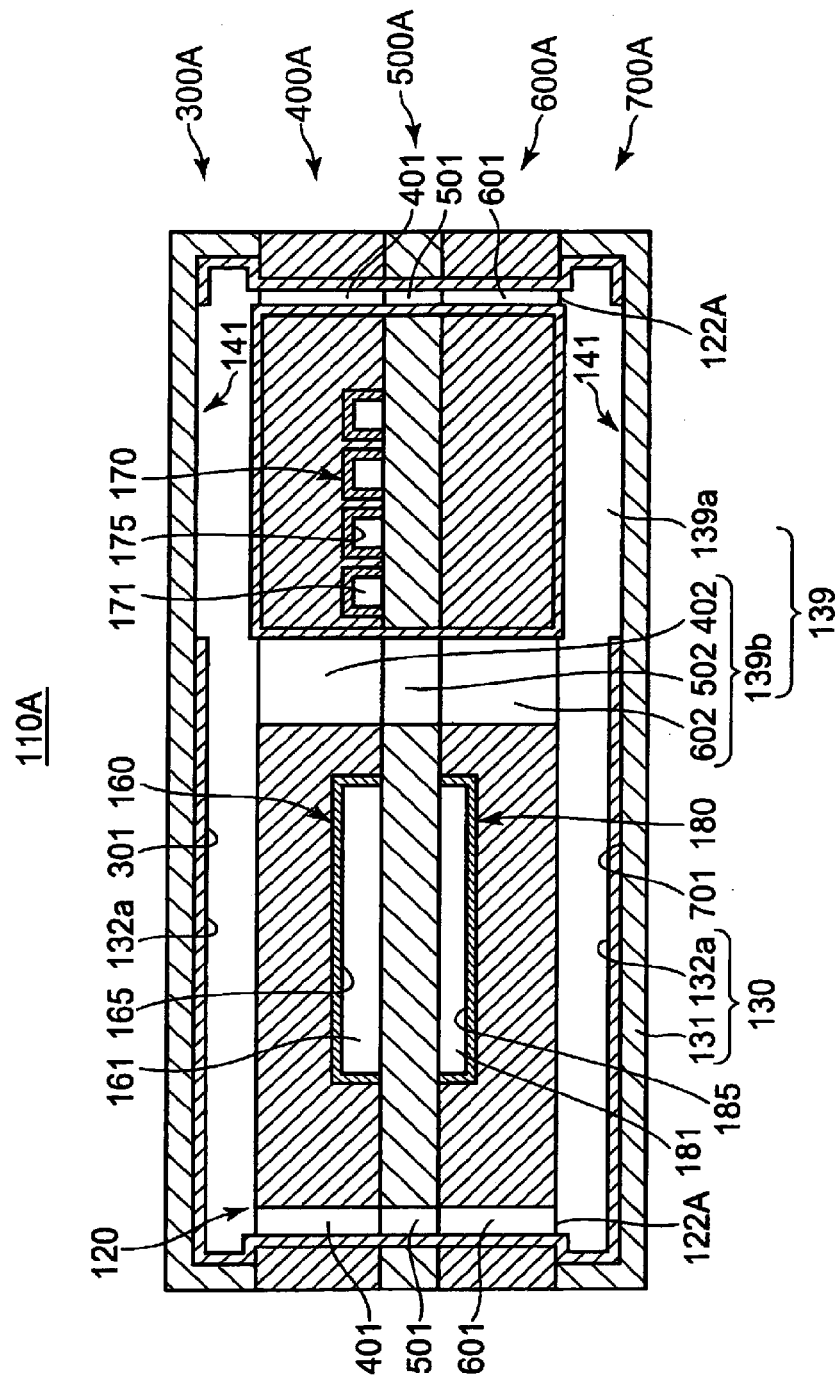
FIG. 35 is a cross-sectional view of FIG. 33 corresponding to line XXXV-XXXV, when seen from the direction indicated by the arrow.

FIG. 33 is a perspective view showing example of another structure of the reaction device according to the present embodiment, and FIG. 34 is a perspective view when seen from the opposite direction with respect to FIG. 33. FIG. 35 is a cross-sectional view of FIG. 33 corresponding to line XXXV-XXXV, when seen from the direction indicated by the arrow. As shown in FIG. 33 through FIG. 35, the supporting portion 122 may be provided not only at the carbon monoxide remover 170 side of the reaction device main body 120 but also to other portions, and supply and discharge portion 123 may be provided to each supporting portion 122. That is, concerning the reaction device 110A shown in FIG. 33 through FIG. 35, supporting portion 122A and 122A are each provided at the carbon monoxide remover 170 side and the reformer 160 side of the heat-insulating container 130, and supply and discharge portion 123A is provided to each of the supporting portion 122A and 122A in a separated manner. Here, the reaction device 110A can be formed by laminating a plurality of substrates 300A through 700A, in the same manner as the aforementioned embodiment. In this case, to the internal surface side of the substrates 300A and 700A that correspond to the first substrate 300 and the fifth substrate 700, heat reflective film 132a is provided in a similar manner, and opening portion 141 is provided to the heat reflective film 132a in a similar manner.

Further, a case where the internal space of the sealed chamber 139 is at vacuum pressure was described. However, it may be filled with rare gas such as argon, helium, and the like.

Hereinafter, reaction device according to the present embodiment will be described further specifically by giving examples and comparative examples.

As for an example of the reaction device 110 according to the present embodiment, a reaction device 110 in which heat reflective film 132a is provided to the first substrate 300 and to the fifth substrate 700 by gold, aluminum, silver, or copper, was formed. The area of opening portion 141 of the heat reflective film 132a was approximately 2.835 cm$^2$ (=2.7 cm×1.05 cm), and area of the carbon monoxide remover 170 was 3.645 cm$^2$ (=approximately 2.7 cm×1.35 cm). That is, the opening ratio of the opening portion 141 was 78%. The temperature of the reformer 160 was 299 degrees Celsius, and the temperature of the carbon monoxide remover 170 was 81 degrees Celsius, with respect to this reaction device main body 120.

Here, as for a comparative example of the present invention, a similar reaction device as the aforementioned embodiment, except that the opening portion 141 was not provided, was formed. The temperature of the reformer 160 was 303 degrees Celsius, and the temperature of the carbon monoxide remover 170 was 132 degrees Celsius, with respect to the reaction device of this comparative example.

As described, concerning the reaction device main body 120 of the example, temperature difference between the reformer and the carbon monoxide remover can be made even larger, compared to the reaction device of the comparative example. Therefore, even when the connection portion 121 is made short, temperature difference between the reformer and the carbon monoxide remover can be maintained, thus size of the reaction device main body 120 can be further minimized.

[Outline Structure of Fuel Cell Device]

Figure 36:
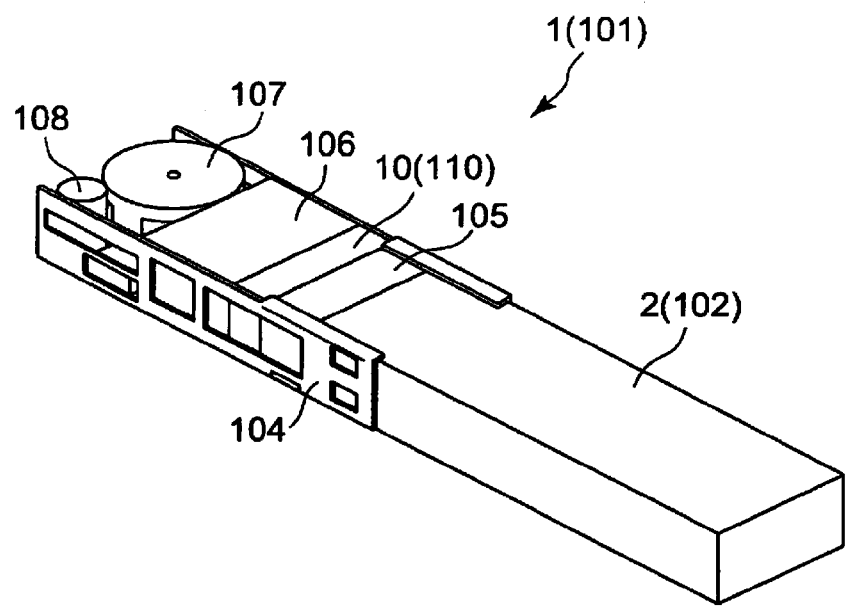
FIG. 36 is a perspective view showing an application example of the fuel cell devices 1, 101 according to the embodiment of the present invention.

Next, outline structure of the fuel cell device 1, 101 are described. FIG. 36 is a perspective view showing one example of fuel cell device 1, 101. As shown in FIG. 36, the aforementioned reaction device 10, 110 can be used in a state in which they are attached to fuel cell device 1, 101. The fuel cell device 1, 101 is provided with, for example, a flame 104; fuel container 2, 102 that are detachable to the flame 104; a flow amount control unit 105 that has a flow passage, a pump, a flow sensor, a bulb, and the like; a vaporizer 50, 150 not shown; reaction device 10, 110; fuel cell 3, 103 not shown; a power generation module 106 that has a humidifying apparatus to humidify the fuel cell 3, 103, a collecting container to collect by-product generated at the fuel cell 3, 103, and the like; air pump 107 to supply air (oxygen) to the reaction device 10, 110 and the power generation module 106; a power source unit 108 that has an external interface to electrically connect with external device that is driven by a secondary battery, a DC-DC converter, or fuel cell device 1, 101; and the like. Gaseous mixture of water and fuel in the fuel container 2, 102 are supplied to the reaction device 10, 110 via the vaporizer 50, 150, by the flow control unit 105. Accordingly, hydrogen gas is generated, hydrogen gas is supplied to the fuel cell 3, 103 of the power generation module 106, and the generated electricity is stored in the secondary battery of the power source unit 108.

[Electronic Apparatus]

Figure 37:
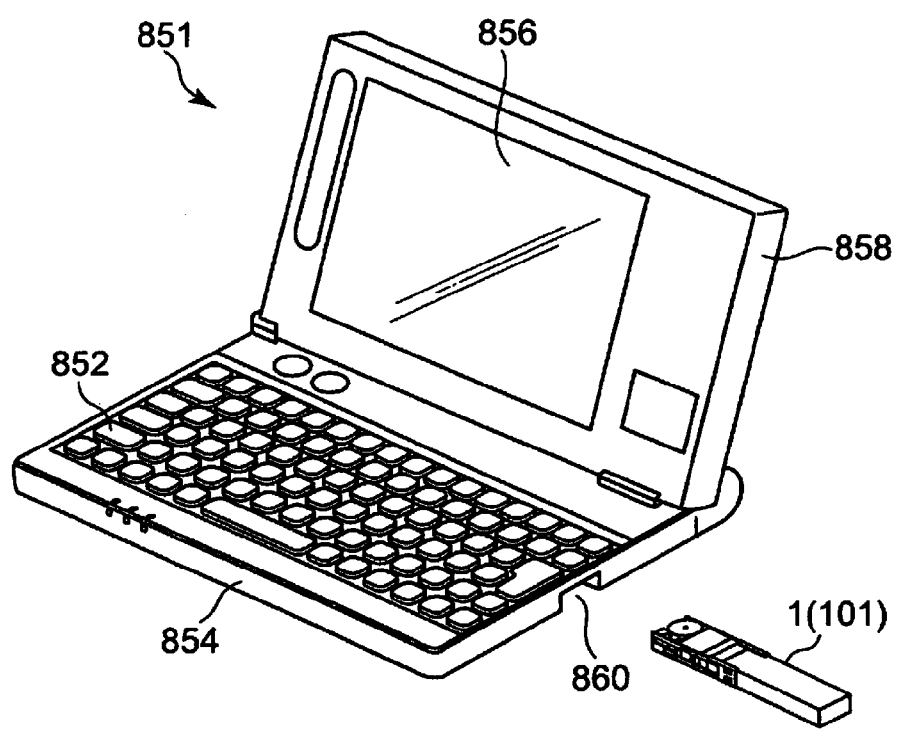
FIG. 37 is a perspective view showing an example of electronic apparatus 851 that uses the fuel cell devices 1, 101 as a power source.

FIG. 37 is a perspective view showing one example of electronic apparatus 851 that uses the fuel cell device 1, 101 as a power source. As shown in FIG. 37, this electronic apparatus 851 is an electronic apparatus of mobile type, such as a laptop personal computer for example. The electronic apparatus 851 has a lower package 854 that is embedded with a calculation processing circuit, structured with CPU, RAM, ROM, and other electronic parts, and is also provided with a key board 852. The electronic apparatus 851 also has an upper package 858 that is provided with a liquid crystal display 856. The lower package 854 and the upper package 858 are connected by a hinge, and are structured so that the upper package 858 can be layered on the lower package 854 to be folded in a state that the liquid display 856 is opposed to the key board 852. From the right side surface to the bottom surface of the lower package 854, an attachment unit 860 is formed to attach the fuel cell device 1, 101. When the fuel cell device 1, 101 is attached to the attachment unit 860, the electronic apparatus 851 performs by the electricity of the fuel cell device 1, 101.

Although various exemplary embodiments have been shown and described, the invention is not limited to the embodiments shown. Therefore, the scope of the invention is intended to be limited solely by the scope of the claims that follow.

What is claimed is:

1. A reaction device, comprising:
   a reaction device main body including a first reaction unit which performs reaction of a first reaction material, and a second reaction unit which performs reaction of a second reaction material;
   a first heater which heats the first reaction unit at a first temperature;
   a second heater which heats the second reaction unit at a second temperature lower than the first temperature;
   a heat reflective film, provided so as to be opposed to an external surface of the reaction device main body, to reflect a heat ray that is radiated from the reaction device main body;
   a heat releasing portion which transmits or absorbs at least a part of the heat ray radiated from the reaction device main body; and
   a container which houses the reaction device main body therein and has a lower heat ray reflectivity than a heat ray reflectivity of the heat reflective film,
   wherein the heat reflective film is provided on an internal wall surface of the container, and
   wherein the heat reflective film includes:
      a first portion which is exposed and which is opposed to the first reaction unit, and
      a second portion which is opposed to the second reaction unit and at which the heat releasing portion is provided.

2. The reaction device as claimed in claim 1, wherein the heat reflective film consists essentially of one of gold, aluminum, silver, and copper.

3. The reaction device as claimed in claim 1, wherein:
   the first reaction unit includes a reformer which is supplied with a vaporized liquid fuel of a hydrocarbon type as the first reaction material and which generates gas including hydrogen as a product material from the first reaction material, and
   the second reaction unit includes a carbon monoxide remover which is supplied with the product material as the second reaction material and which removes carbon monoxide included in the product material.

4. The reaction device as claimed in claim 1, wherein:
   the first reaction unit and the second reaction unit are separately arranged, and the reaction device main body is further provided with a connection portion that connects the first reaction unit and the second reaction unit.

5. The reaction device as claimed in claim 4, wherein a heat-insulating room is provided in between the first reaction unit and the second reaction unit.

6. The reaction device as claimed in claim 4, wherein the second reaction unit is heated by the first heater through the connection portion.

7. The reaction device as claimed in claim 1, wherein the container is made of glass.

8. The reaction device as claimed in claim 1, wherein an internal space of the container is at vacuum pressure.

9. The reaction device as claimed in claim 1, further comprising a supporting portion to support the reaction device main body by connecting the reaction device main body and the container.

10. The reaction device as claimed in claim 9, wherein the supporting portion is provided with a plurality of flow passages to supply reaction material that is used for reaction at the reaction device main body, from outside of the container to the reaction device main body, and to discharge product material that is generated by the reaction at the reaction device main body, to outside of the container.

11. The reaction device as claimed in claim 9, wherein the supporting portion is provided at one end portion at a second reaction unit side of the reaction device main body.

12. The reaction device as claimed in claim 1, wherein at the second portion the heat reflective film is covered with a heat absorbing film to form the heat releasing portion.

* * * * *